(12) United States Patent
Takahashi et al.

(10) Patent No.: US 7,276,900 B2
(45) Date of Patent: Oct. 2, 2007

(54) MAGNETIC CHARACTERISTIC INSPECTING APPARATUS AND INSPECTING METHOD USING IT

(75) Inventors: Masayoshi Takahashi, Yokohama (JP); Masami Makuuchi, Yokohama (JP); Ritsuro Orihashi, Tokyo (JP); Shinji Homma, Nakai (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 11/272,861

(22) Filed: Nov. 15, 2005

(65) Prior Publication Data

US 2006/0132122 A1 Jun. 22, 2006

(30) Foreign Application Priority Data

Dec. 22, 2004 (JP) ............................. 2004-370780

(51) Int. Cl.
*G01R 33/12* (2006.01)

(52) U.S. Cl. ..................................... 324/212; 324/210

(58) Field of Classification Search ........ 324/210–212; 360/31, 75, 25, 77.04
See application file for complete search history.

(56) References Cited

U.S. PATENT DOCUMENTS 5,812,560 A 9/1998 Yuki
6,407,544 B1 6/2002 Watanabe

*Primary Examiner*—Bot LeDynh
(74) *Attorney, Agent, or Firm*—Antonelli, Terry, Stout & Kraus, LLP.

(57) ABSTRACT

A magnetic characteristic inspecting apparatus including a plurality of disk rotating devices or a plurality of magnetic heads include a unit for switching output signals of write signal production units or allocating the output signals to the magnetic heads, a unit for switching signals read from the magnetic heads or allocating the read signals to measurement resources, and a unit for selecting any of the disk rotating devices synchronously with which the measurement resources will perform measurement. The write signal production units and measurement resources are shared among inspections of the plurality of disk rotating devices or the plurality of heads.

18 Claims, 15 Drawing Sheets

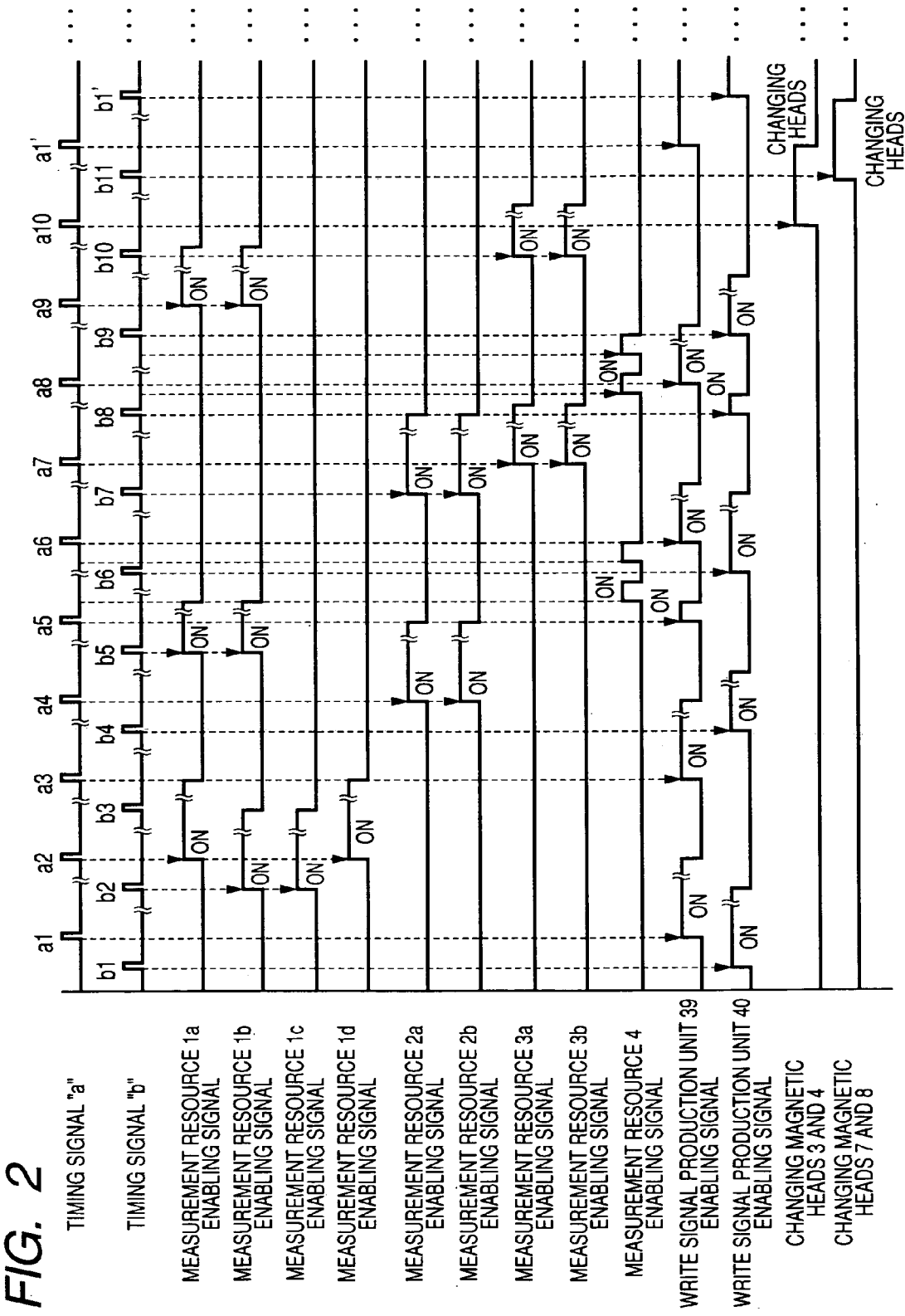

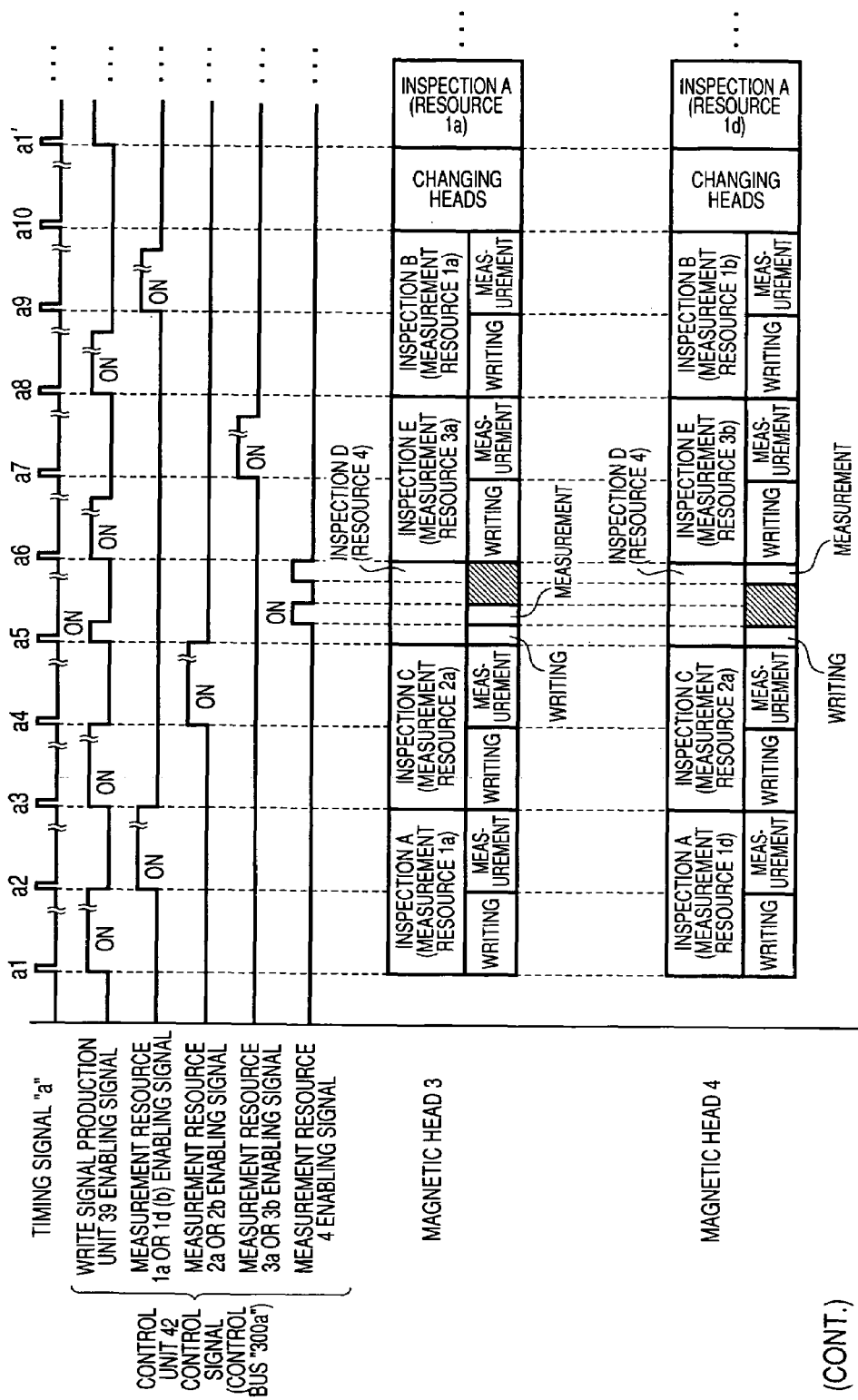

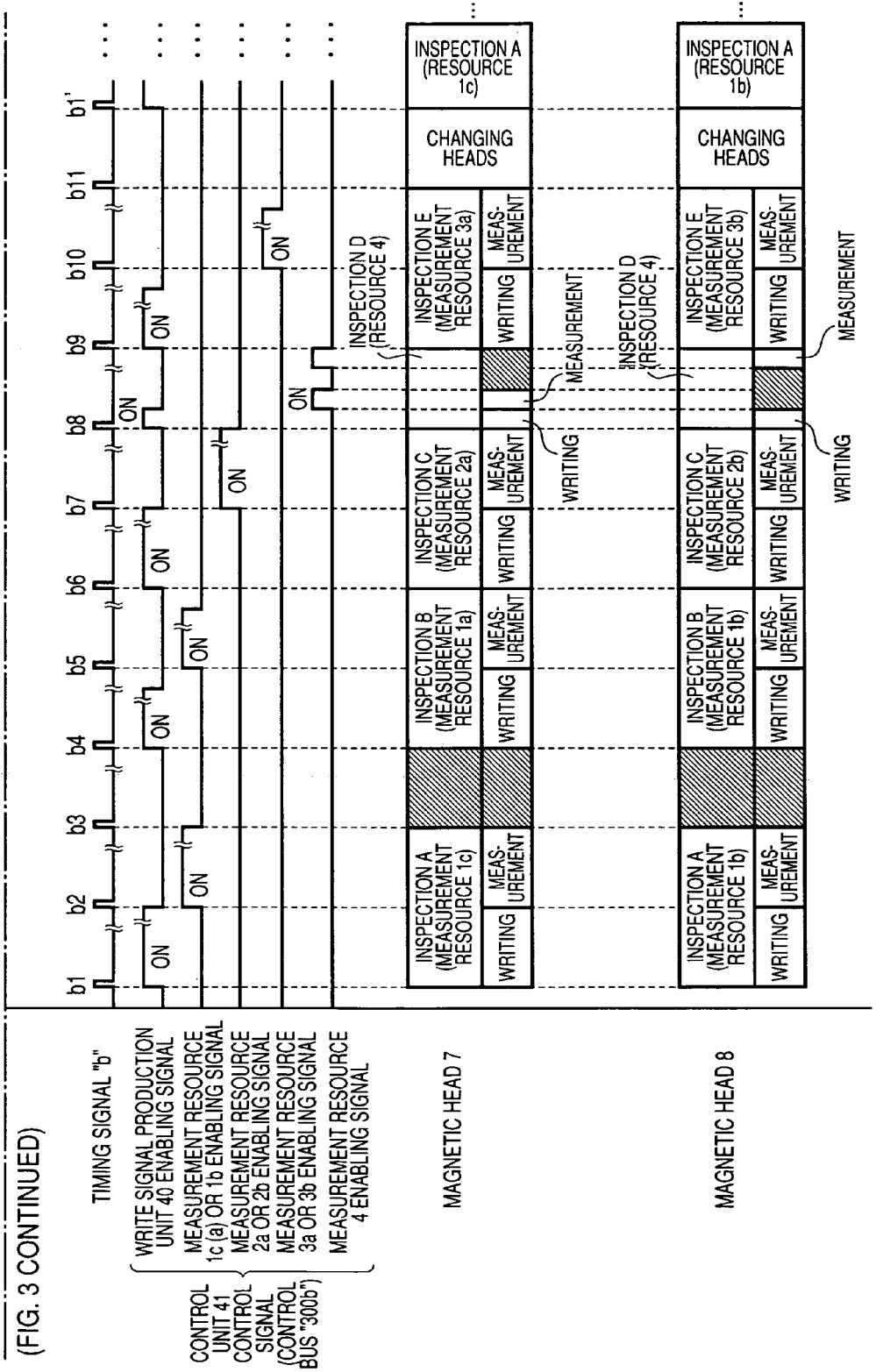

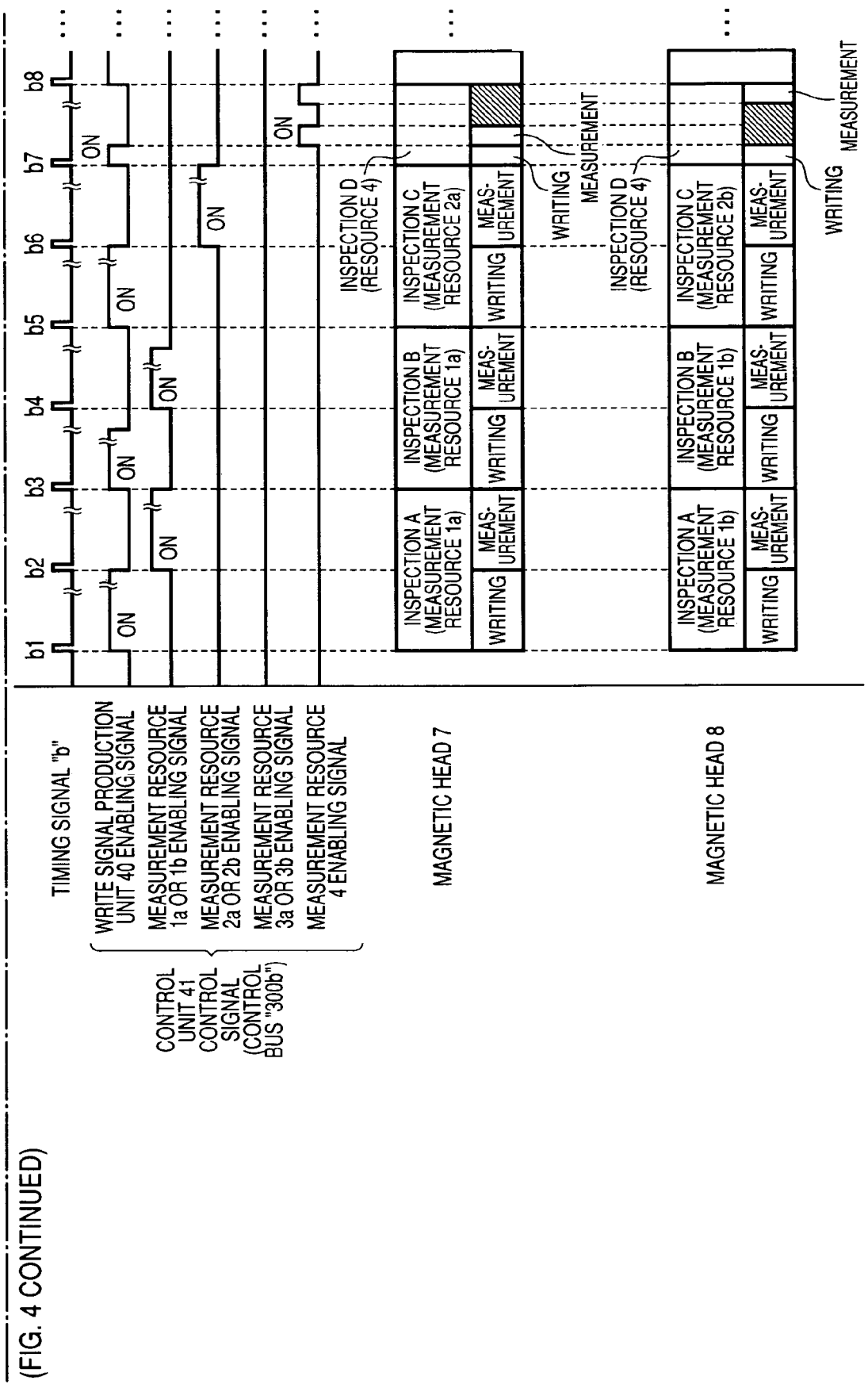
(FIG. 4 CONTINUED)

MAGNETIC CHARACTERISTIC INSPECTING APPARATUS AND INSPECTING METHOD USING IT

CLAIM OF PRIORITY

The present application claims priority from Japanese application JP 2004-370780 filed on Dec. 22, 2004, the content of which is hereby incorporated by reference into this application.

FIELD OF THE INVENTION

The present invention relates to an apparatus for inspecting magnetic disks or magnetic heads included in a magnetic disk drive, and an inspecting method using the inspecting apparatus. More particularly, the present invention is concerned with a magnetic characteristic inspecting apparatus for inspecting writable or readable magnetic disks or magnetic heads, and an inspecting method using the magnetic characteristic inspecting apparatus.

BACKGROUND OF THE INVENTION

In the past, magnetic disk drives have been used as external storage devices to be included in workstations or servers. Along with the prevalence of personal computers or the adaptation thereof to home digital equipment, the trend toward a large storage capacity and a low cost has been encouraged. For inspection of magnetic disks or magnetic heads included in the magnetic disk drive, a method of recording or reproducing test data at an actually adopted frequency so as to assess and inspect magnetic disks or magnetic heads has been adopted. In order to reduce the cost of manufacture for the magnetic disks or magnetic heads, an inspecting apparatus for inspecting the magnetic disks or magnetic heads to be included in the magnetic disk drive (hereinafter simply called a magnetic characteristic inspecting apparatus) is requested to be compact and low-cost.

The magnetic characteristic inspecting apparatus makes it possible to mount two magnetic heads on one magnetic disk that is conventionally attached to one disk rotating device. Thus, for inspection of the magnetic head, a larger number of magnetic heads is simultaneously measurable. For inspection of the magnetic disk, the inner and outer circumferential parts of the magnetic disk are measured simultaneously. Thus, whichever of the magnetic disk and magnetic head is inspected, the throughput of testing is improved. Arts relevant to the magnetic characteristic inspecting apparatus in which two magnetic heads can be mounted include, for example, an art disclosed in U.S. Pat. No. 5,812,560 (Corresponding to Japanese Patent Laid-Open No. H10 (1998)-83501).

Assuming that the magnetic characteristic inspecting apparatus is used to inspect the characteristics of a magnetic head, the inspecting apparatus has two magnetic heads, which are objects of inspection, placed on any track of one magnetic disk which is a non-defective article or whose magnetic characteristics are already known, and records or reproduces a test signal. The characteristics of a reproduced signal are measured and assessed using measurement resources, whereby each of the magnetic heads is inspected. After the inspection is completed, the disk is stopped and the magnetic heads are replaced with uninspected articles. After the replacement is completed, the foregoing inspection is repeated.

FIG. 13 is an example of a timing chart indicating timings of inspecting two magnetic heads (magnetic heads 130 and 131) using four kinds of measurement resources (1 to 4) included in the magnetic characteristic inspecting apparatus. First, a control unit initiates an inspection A (using the measurement resource 1) of the two magnetic heads 130 and 131 at a timing t1, and transmits arbitrary frequency pattern designation data and an output enabling signal, which are needed for the inspection A, to a write signal production unit. In response to the signal, the write signal production unit transmits an arbitrary frequency pattern to a write amplifier. The magnetic heads 130 and 131 receive the signal exhibiting the arbitrary frequency pattern and record (write) the signal on respective tracks on the magnetic disk that are separated from each other by any number of tracks. At a timing t2, the magnetic heads 130 and 131 reproduce a signal from the magnetic disk, and transfer it to the measurement resources 1a, 1b, 2a, 2b, 4a, and 4b. Concurrently, the control unit transmits an enabling signal to the measurement resources 1a and 1b, and the measurement resources 1a and 1b in turn measure the respective reproduced signals or assess (measure) the characteristics of the signals.

Likewise, an inspection B (using the measurement resource 1), an inspection C (using the measurement resource 2), an inspection D (using the measurement resource 4), and an inspection E (using the measurement resource 3) are sequentially carried out. Items of characteristics to be inspected include, for example, a Track Average Amplitude (TAA) of a reproduced signal, a Pulse Width (PW), and a degree of overwriting acceptability. Frequencies at which two magnetic heads record a pattern on a magnetic disk by during each inspection may be different from each other so that recording densities in tracks immediately below the respective magnetic heads will remain constant, or may be identical to each other.

Moreover, assuming that an object of inspection is a magnetic disk, a magnetic head which is a non-defective article or whose recording or reproducing property is already known is used to inspect the magnetic disk.

By the way, U.S. Pat. No. 6,407,544 (Corresponding to Japanese Patent Laid-Open No. 2061-52319) has disclosed a magnetic characteristic inspecting apparatus in which four magnetic head holders are used to simultaneously inspect two magnetic heads placed on one magnetic disk attached to one disk rotating device, and the two magnetic heads are replaced with the other two magnetic heads so that the inspection can be uninterruptedly performed.

SUMMARY OF THE INVENTION

In the magnetic characteristic inspecting apparatus described in U.S. Pat. No. 5,812,560, recording/measurement resources used to inspect a magnetic disk or magnetic heads are occupied for inspections of the respective magnetic heads. If the number of simultaneously measurable magnetic heads or magnetic disks is increased in order to improve inspection efficiency, the inspecting apparatus cannot help being large in size. Accordingly, the cost of the inspecting apparatus increases. In the example described in conjunction with FIG. 13, when the number of simultaneously measurable magnetic heads (130 and 131) is doubled, the number of write signal production units or measurement resources (hereinafter recording/measurement resources) should be simply doubled. Consequently, the volume and cost of the inspecting apparatus is doubled.

On the other hand, the magnetic characteristic inspecting apparatus described in U.S. Pat. No. 6,407,544 is such that the disk rotating device is rotated in order to inspect magnetic heads and the magnetic heads are replaced with the other magnetic heads. The inspection efficiency in presumably improves. However, the magnetic characteristic inspecting apparatus is designed so that when a magnetic disk is rotated, the magnetic heads are permitted to float to only a little degree. In these circumstances, when the magnetic heads that have been inspected are replaced with the others, noises stemming from vibrations caused by the replacement adversely affect measurement of the other magnetic heads. This presumably invites terrible degradation in measurement precision.

The present invention is intended to provide a magnetic characteristic inspecting apparatus that is compact and low-cost and that makes it possible to share recording/measurement resources, which used to be included in association with respective magnetic heads or magnetic disks (or disk rotating devices), among inspections of a plurality of magnetic disks or magnetic heads, and an inspecting method using the magnetic characteristic inspecting apparatus.

The present invention is intended to provide a magnetic characteristic inspecting apparatus that ensures high measurement precision and offers improved inspection efficiency due to an increase in the number of simultaneously measurable magnetic heads or magnetic disks, and an inspecting method using the magnetic characteristic inspecting apparatus.

A magnetic characteristic inspecting apparatus in accordance with the present invention includes: a plurality of disk rotating devices that rotate a magnetic disk; magnetic heads to be placed on the magnetic disks held by the respective disk rotating devices; write signal production units that produce a write signal; a plurality of kinds of measurement units that inspect the characteristics of the waveform of a read signal; a switching/distribution control unit that switches or distributes the output signals of the write signal production units, and switches or distributes read signals to be transferred to the measurement units; and a disk rotating device selecting element that selects any of the disk rotating devices synchronously with which each of the measurement units will operate. Consequently, the recording/measurement resources needed for inspection are shared among inspections of the plurality of disk rotating devices or the plurality of magnetic heads.

BRIEF DESCRIPTION OF THE DRAWINGS

FIG. 2 is a timing chart indicating actions to be performed in the first embodiment of the present invention;

FIG. 3 is a timing chart indicating the actions to be performed in the first embodiment of the present invention;

DESCRIPTION OF THE PREFERRED EMBODIMENTS

Figure 1:
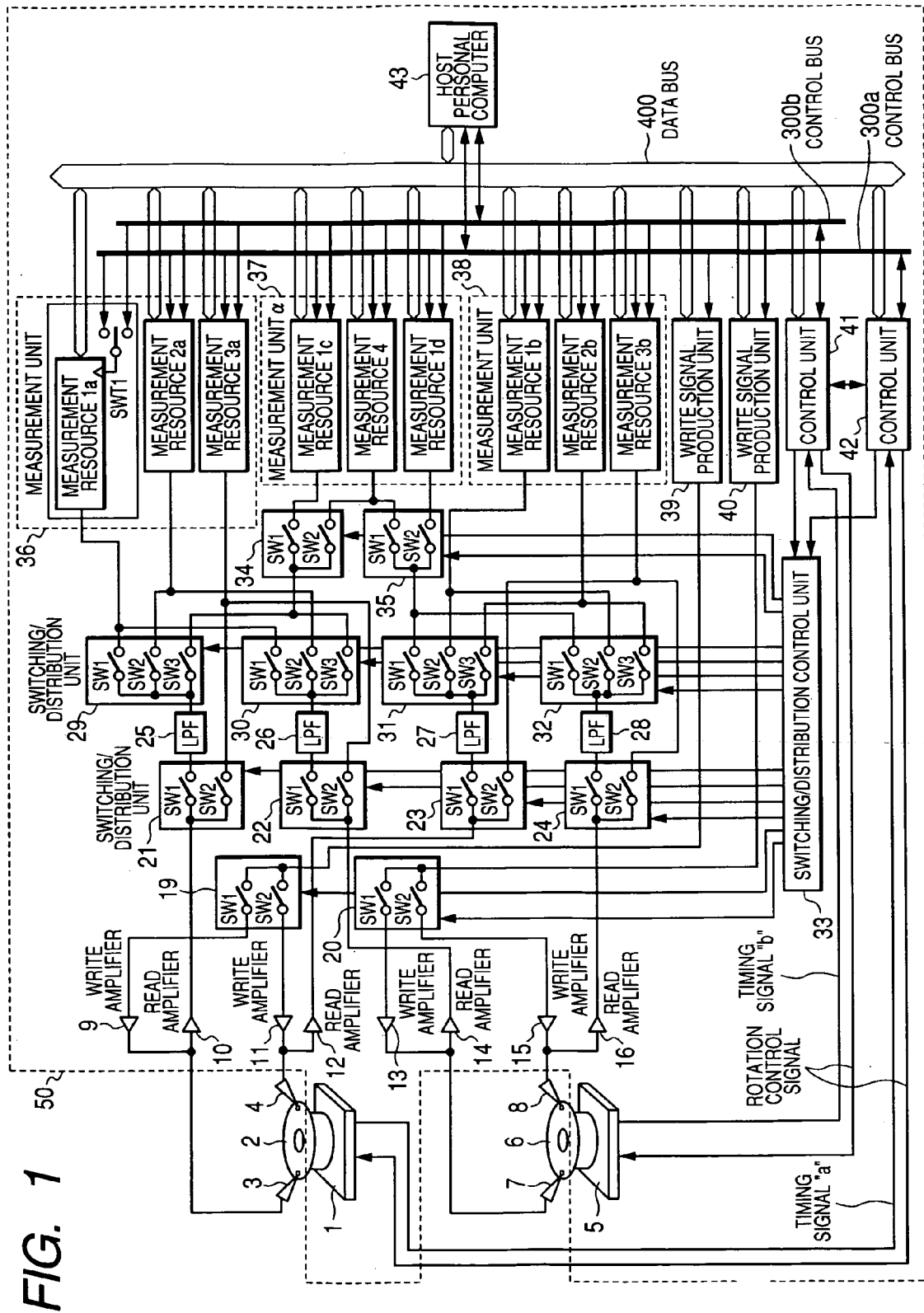
FIG. 1 schematically shows the first embodiment of a magnetic characteristic inspecting apparatus in accordance with the present invention.

Referring to the drawings, embodiments of the present invention will be described below.

First Embodiment

FIG. 1 schematically shows a magnetic characteristic inspecting apparatus in accordance with the first embodiment of the present invention. FIG. 2 and FIG. 3 are timing charts for use in explaining an example of actions to be performed in the magnetic characteristic inspecting apparatus in accordance with the first embodiment. In the present embodiment, as described below, two write signal production units and four kinds of measurement resources (1 to 4) are partly used in common so that inspections of four magnetic heads can be performed at substantially identical timings. Specifically, the magnetic characteristic inspecting apparatus includes recording/measurement resources of a general-purpose type usable for any magnetic head and recording/measurement resources of a limited type usable exclusively for a specific magnetic head.

Referring to FIG. 1, the magnetic characteristic inspecting apparatus 50 that inspects magnetic heads or magnetic disks includes two independent disk rotating devices 1 and 5. Each of the disk rotating devices has a magnetic disk mount disposed on the end of a spindle that is driven by a motor (not shown). Two magnetic heads (3 and 4 or 7 and 8) are disposed on a magnetic disk 2 or 6 placed on the mount.

The magnetic characteristic inspecting apparatus 50 further includes write amplifiers 9, 11, 13, and 15 and read amplifiers 10, 12, 14, and 16 that are associated with the respective magnetic heads.

The disk rotating device 1 or 5 rotates in response to a rotation control signal sent from a control unit 42 or 41. Specifically, the control unit 42 or 41 receives a signal or data that is sent from a host personal computer (PC) 43 over a control bus 300 (300a or 300b) or a data bus 400, and transmits the rotation control signal, with which the number of rotations and the start or stop of rotation are controlled, to the disk rotating device 1 or 5 so as to thus instruct the disk rotating device to start the spindle.

With every rotation made by the spindle of the disk rotating device 1 or 5, one index pulse is transmitted. The disk rotating device transmits a timing signal "a" or "b," which indicates the timings of the rotations made by the disk rotating device itself and which is composed of index pulses (or sector pulses), to the control unit 42 or 41. Based on the timing signal, the control units 42 and 41 control the write signal production units 39 and 40, measurement resources included in the measurement units 36, 38, and a (37), and a switching/distribution control unit 33.

FIG. 2 shows an example of the timing signals "a" and "b," and signals which are produced based on the timing signals and with which the switching/distribution control unit 33 and others are controlled. The timing signal is composed of index pulses or the like but the timing of the timing signal is not always consistent with the start timing when the disk rotating device 1 or 5 is started. As shown in FIG. 2, the timing signals "a" and "b" may therefore be slightly out of phase with each other. Herein, the timing signal "a" is shown to lag behind the timing signal "b." However, the timing signals "a" and "b" may be in phase with each other.

Referring back to FIG. 1, the output terminals of the write signal production units 39 and 40 are connected to the write amplifiers 9, 11, 13, and 15 via the switching/distribution units 19 and 20 respectively. When the switches SW1 included in the switching/distribution units 19 and 20 respectively are turned on, the outputs of the write signal production units 39 and 40 are transferred to the write amplifiers 9 and 13 respectively. When the switches SW2 included in the switching/distribution units 19 and 20 respectively are turned on, the outputs of the write signal production units 39 and 40 are transferred to the write amplifiers 11 and 15 respectively. The four kinds of measurement resources 1a, 1b, 1c, 1d, 2a, 2b, 3a, 3b, and 4 receive an enabling signal from the control unit 42 or 41 over the control bus 300a or 300b. When the enabling signal has an on-state level, the measurement resource performs measurement.

Among the recording/measurement resources included in the magnetic characteristic inspecting apparatus, the measurement resources 1a, 1b, 2a, 2b, 3a, 3b, and 4 are of a general-purpose type usable for any magnetic heads, while the measurement resources 1c and 1d are of a limited type usable exclusively for a specific magnetic head. Namely, the measurement resource 1c is usable exclusively for the magnetic head 7 and the measurement resource 1d is usable exclusively for the magnetic head 4. Moreover, the write signal production unit 39 is associated with one pair of magnetic heads (3 and 4), and the write signal production unit 40 is associated with the other pair of magnetic heads (7 and 8).

The enabling signals with which the respective recording/measurement resources are controlled are, as shown in FIG. 2, synchronous with the timing signal "a" (composed of pulses a1 to an) or "b" (composed of pulses b1 to bn).

Referring back to FIG. 1, each of the measurement resources included in the measurement units incorporated in the magnetic characteristic inspecting apparatus 50 has a disk rotating device selecting element (switch SW) that selects one of the disk rotating devices 1 and 5 so that each of the measurement resources will operate synchronously with the timing signal ("a" or "b") sent from the selected disk rotating device. By the way, the control bus 300a is associated with the timing signal "a" and the control unit 300b is associated with the timing signal "b."

Based on the position of the switch SW that is the disk rotating device selecting element, either of the control buses 300a and 300b is selected so that each of the measurement resources will operate according to an enabling signal sent over the selected control bus. Among the disk rotating device selecting elements that select the enabling signal, only the disk rotating device selecting element included in the measurement resource 1a incorporated in the measurement unit 36 is shown as a switch SWT1. The measurement resource 1a receives both the enabling signal sent from the control unit 42 over the control bus 300a and the enabling signal sent from the control unit 41 over the control bus 300b, and switches the connections of the internal switch so as to select either of the enabling signals based on which the measurement resource performs measurement. The other measurement resources have respective disk rotating device selecting facilities (switches SWTn) that have the same structure as the one included in the measurement resource 1a.

The switching/distribution control unit 33 controls the switches included in the switching/distribution units 19, 20, 21, 22, 23, 24, 29, 30, 31, 32, 34, and 35, and the switches included in the measurement resources according to the signal sent from the control unit 42 or 41.

The switching/distribution units 21, 22, 23, 24, 29, 30, 31, 32, 34, and 35 are included in order to switch the destinations of a reproduced signal having passed through the read amplifier 10, 12, 14, or 16 or distribute the reproduced signal to the measurement resources and then transmit the reproduced signal.

The output terminal of the read amplifier 10 is connected to the switching/distribution unit 21. The output terminal of the switch SW1 in the switching/distribution unit is connected to the switching/distribution unit 29 via a low-pass filter 25, and the output terminal of the switch SW2 therein is connected to the measurement resource 3a. The output terminal of the switch SW1 included in the switching/distribution unit 29 is connected to the measurement resource 1a, the output terminal of the switch SW2 therein is connected to the measurement resource 2a, and the output terminal of the switch SW3 therein is connected to the switching/distribution unit 34. The output terminal of the switch SW1 included in the switching/distribution unit 34 is connected to the measurement resource 1c, and the output terminal of the switch SW2 included therein is connected to the measurement resource 4.

The output terminal of the read amplifier 12 is connected to the switching/distribution unit 23. The output terminal of the switch SW1 included in the switching/distribution unit 23 is connected to the switching/distribution unit 31 via the low-pass filter 27, and the output terminal of the switch SW2 included therein is connected to the measurement resource 3b. The output terminal of the switch SW1 included in the switching/distribution unit 31 is connected to the switching/distribution unit 35, the output terminal of the switch SW2 included therein is connected to the measurement resource 1b, and the output terminal of the switch SW3 included therein is connected to the measurement resource 2b. The output terminal of the switch SW1 included in the switching/distribution unit 35 is connected to the measurement resource 1d, and the output terminal of the switch SW2 included therein is connected to the measurement resource 4.

The output terminal of the read amplifier 14 is connected to the switching/distribution unit 22. The output terminal of the switch SW1 included in the switching/distribution unit 22 is connected to the switching/distribution unit 30 via the low-pass filter 26, and the output terminal of the switch SW2 included therein is connected to the measurement resource 3a. The output terminal of the switch SW1 included in the switching/distribution unit 30 is connected to the measurement resource 1a, the output terminal of the switch SW2 included therein is connected to the measurement resource 2a, and the output terminal of the switch SW3 included therein is connected to the measurement/distribution unit 34.

The output terminal of the read amplifier 16 is connected to the switching/distribution unit 24. The output terminal of the switch SW1 included in the switching/distribution unit 24 is connected to the switching/distribution unit 32 via the low-pass filter 28, and the output terminal of the switch SW2 included therein is connected to the measurement resource 3b. The output terminal of the switch SW1 included in the switching/distribution unit 32 is connected to the switching/distribution unit 35, the output terminal of the switch SW2 included therein is connected to the measurement resource 1b, and the output terminal of the switch SW3 included therein is connected to the measurement resource 2b.

Herein, the output terminals of the switches SW2 included in the switching/distribution units 21 and 22, the output terminals of the switches SW2 included in the switching/distribution units 23 and 24, the output terminals of the switches SW1 included in the switching/distribution units 29 and 30, the output terminals of the switches SW2 included in the switching/distribution units 29 and 30, the output terminals of the switches SW3 included in the switching/distribution units 29 and 30, the output terminals of the switches SW1 included in the switching/distribution units 31 and 32, the output terminals SW2 included in the switching/distribution units 31 and 32, the output terminals of the switches SW3 included in the switching/distribution units 31 and 32, and the output terminals of the switches SW2 included in the switching/distribution units 34 and 35 are connected to each other.

The control units 42 and 41 extend control so as not to select two switches whose output terminals are connected to each other. The control is such that: the control units 42 and 41 monitor the control situations of the mates using monitor signals; and when one of switches whose output terminals are connected to each other is turned on, the control units stand by but do not select the other switch.

As shown in FIG. 2, in the present embodiment, the write signal production units 39 and 40, the measurement resources, and the switching/distribution control unit 33 are controlled with respective enabling signals synchronous with timing signal "a" or "b" (composed of pulses a1 to an or pulses b1 to bn) indicating the timings of rotations made by the disk rotating device 1 or 5. Two pairs of magnetic heads 3 and 4 and magnetic heads 7 and 8 are inspected simultaneously. Specifically, while four kinds of measurement resources are used in common, the two pairs of magnetic heads (four magnetic heads) are inspected at nearly identical timings. The two pairs of magnetic heads having been inspected are replaced with uninspected articles at the timing of performing no inspection (neither writing nor measurement). The same inspection is then resumed.

FIG. 3 is a timing chart indicating an example of actions to be performed in the magnetic characteristic inspecting apparatus, which has the configuration shown in FIG. 1, in order to initiate inspections of four magnetic heads simultaneously. The actions will be described below.

The control units 42 and 41 initiate inspections A of four magnetic heads (using the measurement resources 1a, 1b, 1c, and 1d) at timings a1 and b1 respectively.

First, the switching/distribution control unit 33 receive signals sent from the control units 42 and 41 respectively, and extend control so as to turn on the switches SW1 and SW2 included in the switching/distribution units 19 and 20, the switches SW1 included in the switching/distribution units 21, 22, 23, and 24, the switch SW1 included in the switching/distribution unit 29, the switch SW3 included in the switching/distribution unit 30, the switch SW1 included in the switching/distribution unit 31, the switch SW2 included in the switching/distribution unit 32, the switch SW1 included in the switching/distribution unit 34, and the switch SW1 included in the switching/distribution unit 35.

The on or off states of the switches SW included in the measurement resources are designated so that the measurement resources 1a and 1d will perform measurement according to an enabling signal sent from the control unit 42 and the measurement resources 1b and 1c will perform measurement according to an enabling signal sent from the control unit 41.

At the same time, the control units 42 and 41 transmit arbitrary frequency pattern designation data, which is needed for the inspection A, to the write signal production units 39 and 40 respectively so as to designate an arbitrary frequency pattern for the write signal production units. Thereafter, the control units 42 and 41 transmit an output enabling signal.

In response to the respective output enabling signal, the write signal production units 39 and 40 transmit the arbitrary frequency pattern. The signals exhibiting the arbitrary frequency patterns are stored in the magnetic disks 2 and 6 respectively via the switching/distribution unit 19 or 20, the write amplifiers 9 and 11 or 13 and 15, and the magnetic heads 3 and 4 or 7 and 8.

Thereafter, at timing a2, the magnetic heads 3 and 4 reproduce a signal from the magnetic disk 2. At timing b2, the magnetic heads 7 and 8 reproduce a signal from the magnetic disk 6. The signal reproduced by the magnetic head 3 is transferred to the measurement resource 1a included in the measurement unit 36 via the read amplifier 10, switching/distribution unit 21, low-pass filter 25, and switching/distribution unit 29. Likewise, the signal reproduced by the magnetic head 4 is transferred to the measurement resource 1d, the signal reproduced by the magnetic head 7 is transferred to the measurement resource 1c, and the signal reproduced by the magnetic head 8 is transferred to the measurement resource 1b.

Concurrently, at timing a2, the control unit 42 sets an enabling signal, which is transferred to each of the measurement resources 1a and 1d, to an on-state level. At timing b2, the control unit 41 sets an enabling signal, which is transferred to each of the measurement resources 1c and 1b, to the on-state level. The measurement resources assess the characteristics of the reproduced signal, and transmit assessment data to the host personal computer 43. Consequently, the inspection A is completed.

Thereafter, at timing b3, the control unit 41 attempts to initiate an inspection B (using the measurement resources 1a and 1b) of the magnetic heads 7 and 8. However, since the control unit 42 is using the measurement resource 1a, the control unit 41 stands by for the next timing b4.

Thereafter, at timing a3, the magnetic heads 3 and 4 undergo an inspection C (to be performed using the measurement resources 2a and 2b). At timing b4, the magnetic head 7 and 8 undergo the inspection B. Thereafter, inspections are performed at timings indicated by the timing signals "a" and "b."

The inspection D will be described below because it is different from the other inspections. At timing a5, the control unit 42 initiates the inspection D of the magnetic heads 3 and 4. First, the switching/distribution control unit 33 receives a signal from the control unit 42, and turns on the switches SW1 and SW2 included in the switching/distribution unit 19, the switches SW1 included in the switching/distribution units 21 and 23, the switch SW3 included in the switching/distribution unit 29, the switch SW1 included in the switching/distribution unit 31, and the switch SW2 included in the switching/distribution unit 34. Moreover, the on or off states of the switches included in the measurement resources are designated so that the measurement resource 4 will perform measurement in response to an enabling signal sent from the control unit 42.

At the same time, the control unit 42 transmits arbitrary frequency pattern designation data, which is used to perform the inspection D, to the write signal production unit 39 so as to designate an arbitrary frequency pattern. Thereafter, the control unit sets an output enabling signal to an on-state level.

In response to the output enabling signal, the write signal production unit 39 transmits the arbitrary frequency pattern. The signal exhibiting the arbitrary frequency pattern is recorded in the magnetic disk 2 via the switching/distribution unit 19, write amplifiers 9 and 11, and magnetic heads 3 and 4. After the recording is completed, the magnetic head 3 reproduces a signal from the magnetic disk 2. The reproduced signal is transferred to the measurement resource 4 included in the measurement unit α 37 via the read amplifier 10, switching/distribution unit 21, low-pass filter 25, and switching/distribution units 29 and 34.

Concurrently with reproduction of the signal, the control unit 42 sets the enabling signal, which is transferred to the measurement resource 4, to the on-state level, assesses the characteristic of the reproduced signal, and transmits assessment data to the host personal computer 43. The inspection D of the magnetic head 3 is then completed.

After the inspection of the magnetic head 3 is completed, the control unit 42 transmits a signal to the switching/distribution control unit 33, turns off the switch SW2 included in the switching/distribution unit 34, and then turns on the switch 2 included in the switching/distribution unit 35. After the on or off states of the switches are established, the magnetic head 4 initiates reproduction of a signal. The reproduced signal is transferred to the measurement resource 4 included in the measurement unit α 37 via the read amplifier 12, switching/distribution unit 23, low-pass filter 27, and switching/distribution units 31 and 35. Concurrently, the control unit 42 sets an enabling signal, which is transferred to the measurement resource 4, to an on-state level, assesses the characteristic of the reproduced signal, and transmits assessment data to the host personal computer 43. The inspection D of the magnetic head 4 is completed. The inspection D of the magnetic heads 7 and 8 to be initiated at timing b8 is performed in the same manner as the aforesaid one.

Finally, at timings a10 and b11 at which all inspections have been performed on all the magnetic heads, the control units 42 and 41 stop the disk rotating devices 1 and 5 respectively, replace the magnetic heads 3, 4, 7, and 9 with uninspected articles, and resume inspection.

According to the present embodiment, the recording/measurement resources are used in common so that four magnetic heads can be sequentially inspected at nearly identical timings and replaced with uninspected articles. Namely, according to the present embodiment, although resources of a limited type (1*d* and 1*c*) are used exclusively for specific magnetic heads (4 and 7), since the timings of using resources of a general-purpose type are appropriately controlled while restrictions on a use sequence of resources are observed, a plurality of resources can be efficiently shared. Moreover, the four magnetic heads are inspected at the nearly identical timings and then replaced with uninspected articles.

Consequently, there is provided a compact and low-cost magnetic characteristic inspecting apparatus whose inspection efficiency has improved owing to an increase in the number of simultaneously measurable magnetic heads or magnetic disks.

Moreover, two pairs of magnetic heads having been inspected are replaced with uninspected articles at the timing when no inspection (neither writing nor measurement) is performed, and the next inspection is initiated. Consequently, noises derived from replacement of magnetic heads will not adversely affect an inspection (writing and measurement). Thus, there is provided a magnetic characteristic inspecting apparatus that enjoys high measurement precision and improved inspection efficiency.

A Variant of the First Embodiment

Figure 4:
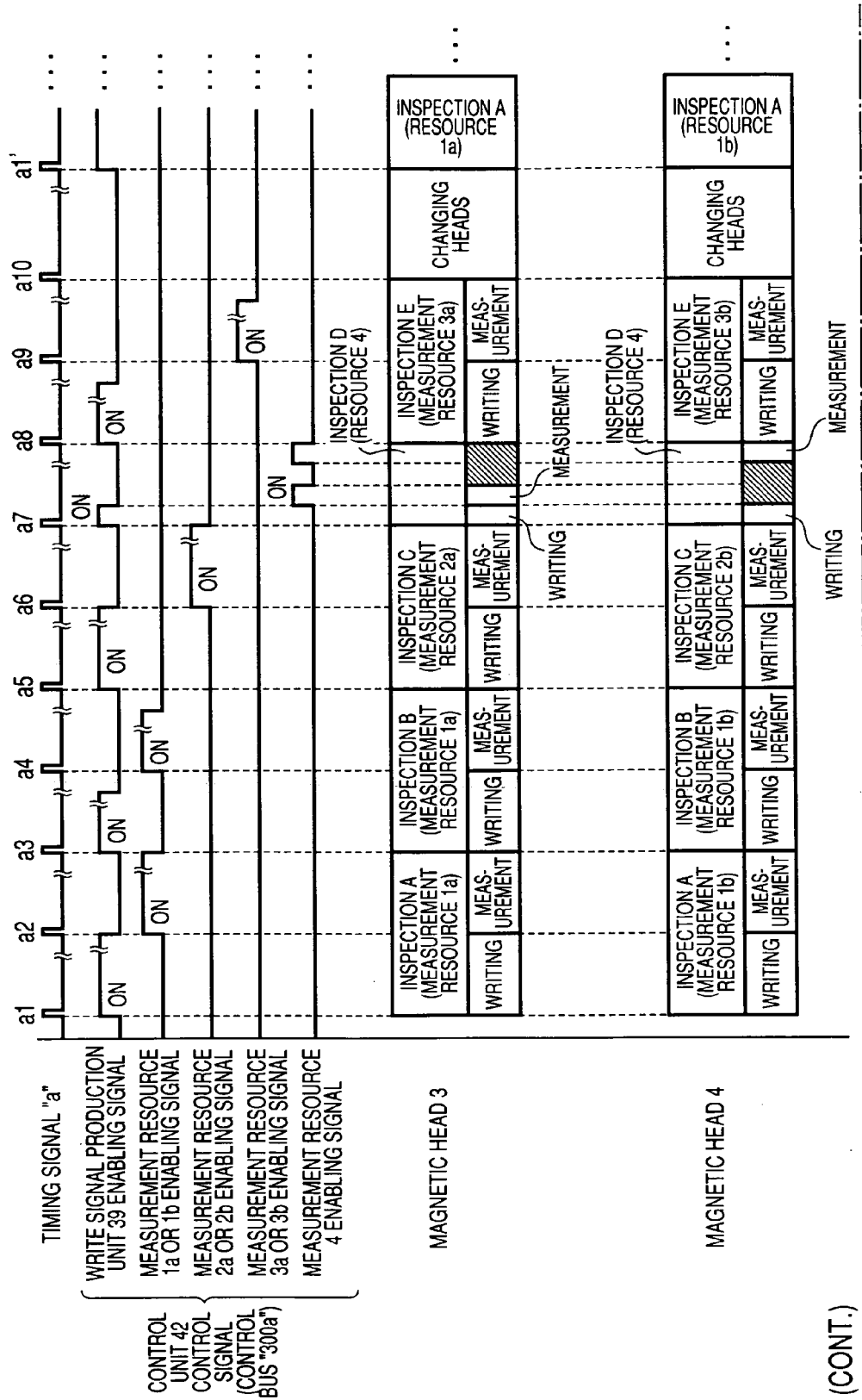
FIG. 4 is a timing chart indicating actions to be performed in a variant of the first embodiment of the present invention.

Next, a variant of the first embodiment will be described in conjunction with FIG. 4. The variant is an example of a magnetic characteristic inspecting apparatus that does not, unlike the magnetic characteristic inspecting apparatus shown in FIG. 1, have the measurement resource 1*c* and measurement resource 1*d*. In this example, since the number of measurement resources or the number of kinds of measurement resources is smaller, the magnetic heads 3 and 4 and the magnetic heads 7 and 8 are inspected with the timings of initiating the inspections differentiated from each other. FIG. 4 shows an example of actions to be performed in the first variant.

First, in response to a signal sent from the host personal computer 43, the control unit 42 transmits a rotation control signal, with which the number of rotations and the start and stop of rotation are controlled, to the disk rotating device 1 so as to start the disk rotating device 1. The disk rotating device 1 transmits the timing signal "a," which indicates the timings of rotations and is composed of index pulses or sector pulses, to the control unit 42.

The control unit 42 initiates an inspection A (using the measurement resources 1*a* and 1*b*) at timing a1. First, the switching/distribution control unit 33 receives a signal from the control unit 42, and turn on the switches SW1 and SW2 included in the switching/distribution unit 19, the switches SW1 included in the switching/distribution units 21 and 23, the switch SW1 included in the switching/distribution unit 29, and the switch SW2 included in the switching/distribution unit 31. Moreover, the on or off states of the switches included in the respective measurement resources are established so that the measurement resources 1*a* and 1*b* will perform measurement in response to an enabling signal sent from the control unit 42.

Concurrently, the control unit 42 transmits arbitrary frequency pattern designation data, which is used to perform the inspection A, to the write signal production unit 39, and designates an arbitrary frequency pattern. Thereafter, the control unit 42 sets an output enabling signal to an on-state level. In response to the output enabling signal, the write signal production unit 39 transmits the arbitrary frequency pattern. The signal exhibiting the arbitrary frequency pattern is recorded in the magnetic disk 2 via the switching/distribution unit 19, the write amplifiers 9 and 11, and the magnetic heads 3 and 4.

Thereafter, at timing a2, the magnetic heads 3 and 4 reproduce a signal from the magnetic disk 2. The signal reproduced by the magnetic head 3 is transferred to the measurement resource 1*a* included in the measurement unit 36 via the read amplifier 10, switching/distribution unit 21, low-pass filter 25, and switching/distribution unit 29. Likewise, the signal reproduced by the magnetic head 4 is transferred to the measurement resource 1*b*. Concurrently, at timing a2, the control unit 42 sets an enabling signal, which is transferred to each of the measurement resources 1a and 1b, to a non-state level. The measurement resources 1a and 1b assess the characteristics of the reproduced signal, and transmit assessment data to the host personal computer 43. Consequently, the inspection A is completed.

Likewise, at timings a3 and a4, an inspection B is performed on the magnetic heads 3 and 4.

At timing a5, an inspection C of the magnetic heads 3 and 4 is initiated. Concurrently, the control unit 42 transmits a signal, with which the inspection of the magnetic heads 7 and 8 is initiated, to the control unit 41. In response to the signal, the control unit 42 transmits a rotation control signal, with which the number of rotations and the start or stop of rotation are controlled, to the disk rotating device 5. This starts the disk rotating device 5. The disk rotating device 5 transmits a timing signal "b," which indicates the timings of rotations and is composed of index pulses or sector pulses, to the control unit 41. The control unit 41 initiates an inspection A (using the measurement resources 1a and 1b) at timing b1, and proceeds with the inspection of the magnetic heads 7 and 8 by following subsequent timings.

After the magnetic heads 3 and 4 whose inspection is initiated earlier have undergone all inspections, the control unit 42 stops the disk rotating device 1 at timing a10. The magnetic heads 3 and 4 are replaced with uninspected articles, and inspection is resumed. While the magnetic heads 3 and 4 are being replaced with the uninspected articles, the magnetic heads 7 and 8 are uninterruptedly inspected. At the timing when the magnetic heads 7 and 8 have undergone all inspections, the control unit 41 stops the disk rotating device 5, replaces the magnetic heads 7 and 8 with uninspected articles, and then resumes inspection.

In the foregoing series of actions, since the timing of replacing the magnetic heads 3 and 4 with uninspected articles is differentiated from the timing of replacing the magnetic heads 7 and 8 with uninspected articles, the efficiency in replacement of heads to be performed by a worker is improved. Moreover, inspection is achieved smoothly. Namely, in the present variant, unlike the first embodiment, the timing of replacing one pair of heads may be differentiated from the timing of replacing the other pair of heads. Even if the time required for replacement of heads may be relatively long for an inspection (writing and measurement) time, as long as the ratio of the head replacement time to the inspection time ranges, for example, from ½ to 1, the procedure can be said to be effective.

Incidentally, in the described example, the inspection of the magnetic heads 7 and 8 is initiated at timing a5. The present embodiment is not limited to this example. Alternatively, for example, inspections may be initiated at different timings as long as measurement resources employed in one inspection are not identical to those employed in the other inspection. After a certain time has elapsed since the initiation of the inspection of the magnetic heads 3 and 4, the inspection of the magnetic heads 7 and 8 may be initiated.

Moreover, according to the first embodiment and variant, magnetic heads are inspected on the same items of characteristics while being placed on the same magnetic disk. The number of measurement resources of each kind that is identical to or larger than the number of magnetic heads to be placed on the same disk is preferably included. However, the number of measurement resources of each kind is not limited to the number of measurement resources that is identical to or larger than the number of magnetic heads. Alternatively, for example, assume that the measurement resources 1c and 1d included in the measurement unit α 37 are measurement resources to be used for assessment of a characteristic to be performed first, such as, measurement of an offset between read and write times required by each magnetic head. In this case, if inspections of a plurality of pairs of magnetic heads are initiated simultaneously, the number of measurement resources should be identical to the number of magnetic heads. This is preferable in order to prevent a decrease in a throughput.

Likewise, if measurement resources are used during a half or more of a time required for all tests, the number of measurement resources should preferably be identical to the number of magnetic heads.

Moreover, if an inspection time during which a certain measurement resource is used is as short as a half or less of a pulse duration of a timing signal, the measurement resource is, like the measurement resource 4 included in the measurement unit α 37, shared among inspections of the magnetic heads to be placed on the same magnetic disk. This contributes to realization of a compact and low-cost design.

Moreover, measurement resources the number of which is identical to a total number of magnetic heads or measurement resources to be shared between inspections of magnetic heads to be placed on the same magnetic disk are not limited to measurement resources of one kind. Alternatively, the measurement resources may be of one or more kinds. Otherwise, such measurement resources may not be included. For example, according to the variant shown in FIG. 4, the measurement resources 1c and 1d shown in FIG. 1 are not needed. A more compact and low-cost design can be realized.

Another Variant of the First Embodiment

Figure 5:
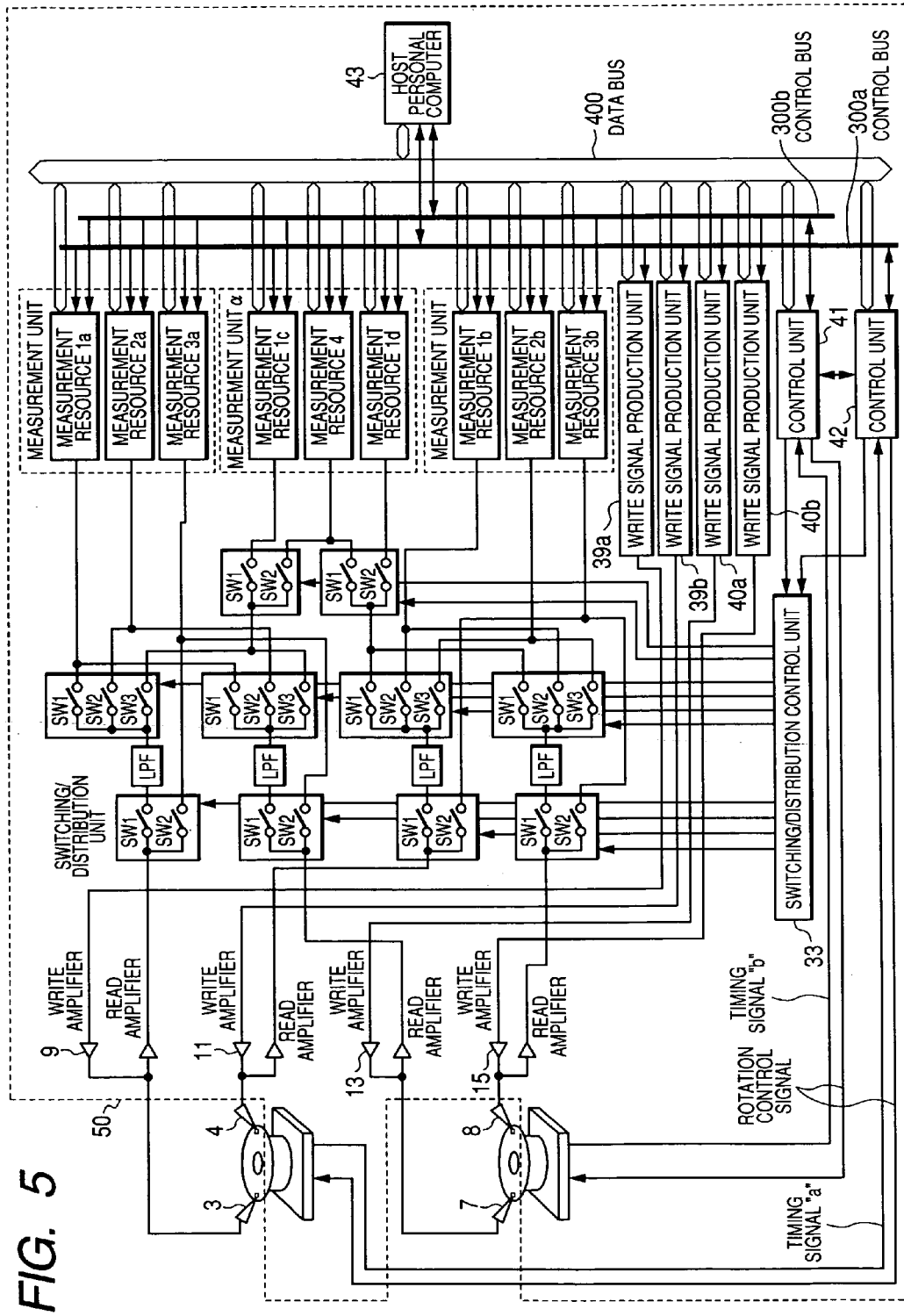
FIG. 5 schematically shows the configuration of another variant of the first embodiment of the present invention.

Moreover, according to the embodiment shown in FIG. 1, the write signal production unit 39 or 40 that is a recording/measurement resource is shared between inspections of the magnetic heads 3 and 4 or 7 and 8. Alternatively, the configuration of the magnetic characteristic inspecting apparatus may be modified to include independent recording resources. Specifically, as shown in FIG. 5 as another variant of the embodiment shown in FIG. 1, an output pattern produced by a write signal production unit 39a may be transferred to the magnetic head 3 via the write amplifier 9. Likewise, an output pattern produced by a write signal production unit 39b may be transferred to the magnetic head 4, an output pattern produced by a write signal production unit 40a may be transferred to the magnetic head 7, and an output pattern produced by a write signal production unit 40b may be transferred to the magnetic head 8. This leads to an increase in freedom in controlling writing and measurement timings. Control can be extended finely according to the contents of an inspection, whereby efficiency can be improved.

Second Embodiment

Figure 6:
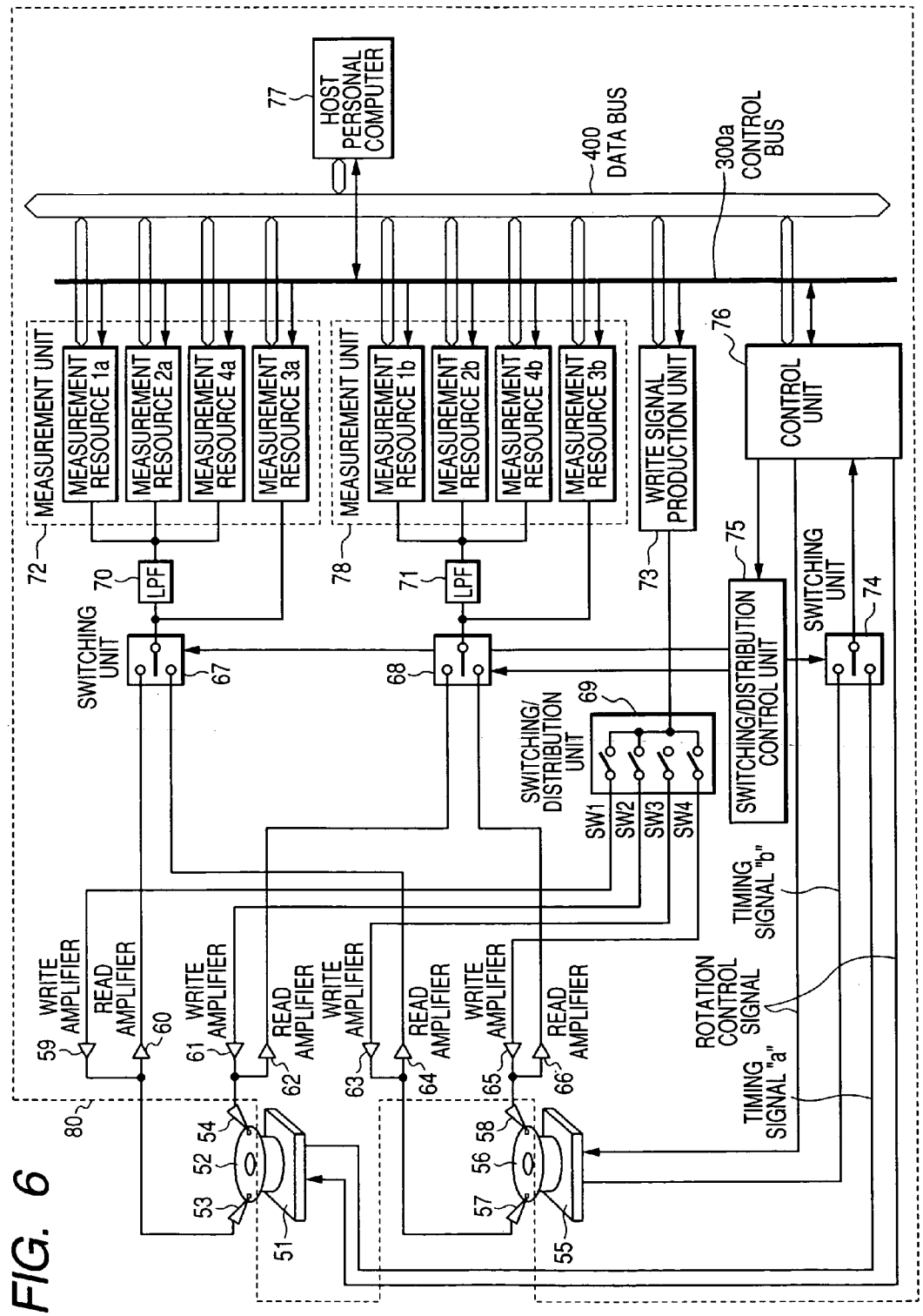
FIG. 6 schematically shows the configuration of the second embodiment of the magnetic characteristic inspecting apparatus in accordance with the present invention.
Figure 7:
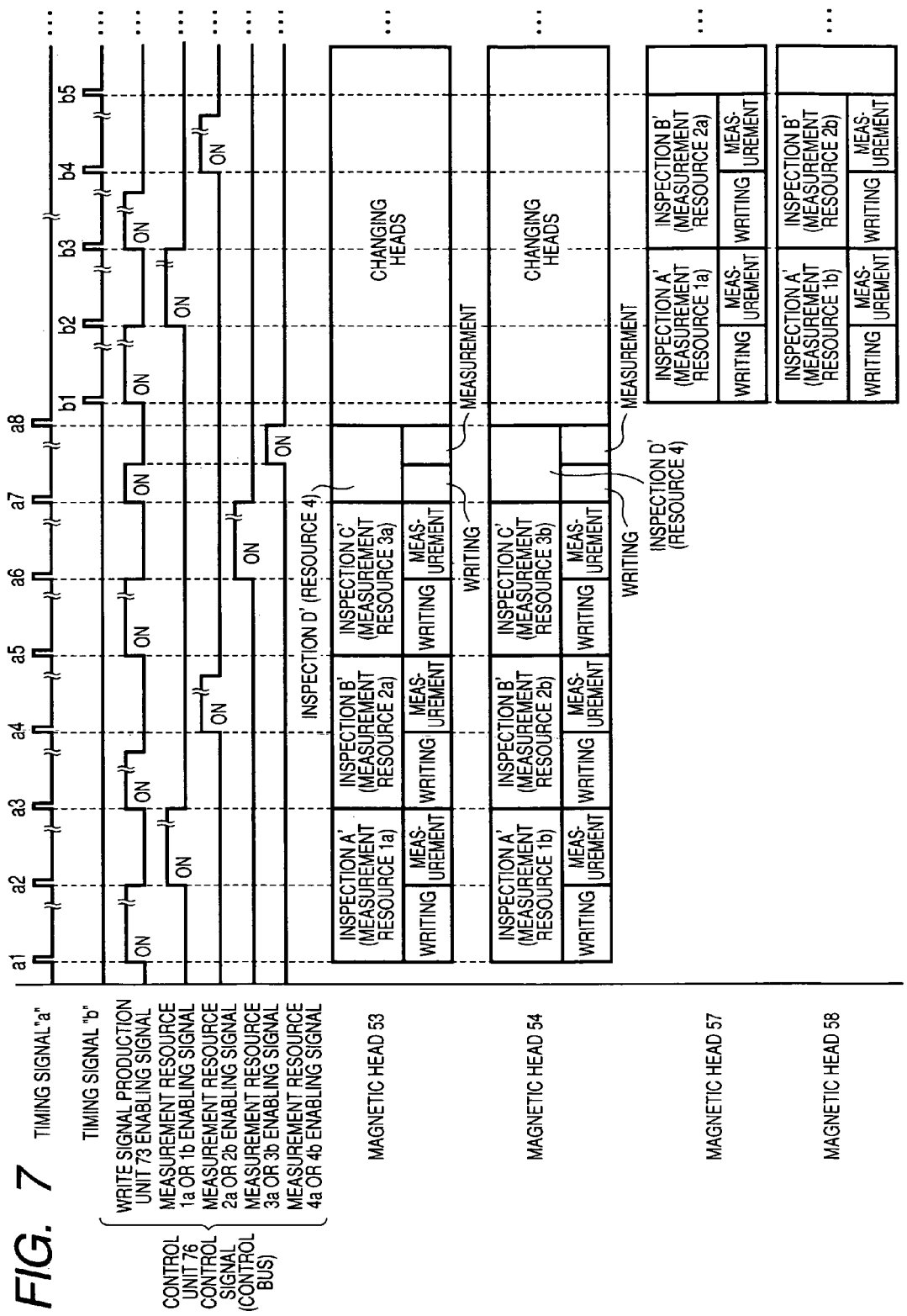
FIG. 7 is a timing chart indicating actions to be performed in the second embodiment of the present invention.

FIG. 6 shows the configuration of the second embodiment of the present invention, and FIG. 7 shows an example of a timing chart for use in explaining actions to be performed in the second embodiment. In this example, among recording/measurement resources included in a magnetic characteristic inspecting apparatus 80, measurement resources 1a, 1b, 2a, 2b, 3a, 3b, and 4 are of a general-purpose type usable for any magnetic heads. Moreover, a write signal production unit 73 can cope with two pairs of magnetic heads (53, 54, 57, and 58). A control bus 300 and a data bus 400 cope with either of timing signals "a" and "b."

Referring to FIG. 6, the magnetic characteristic inspecting apparatus 80 includes disk rotating devices 51 and 55 and magnetic disks 52 and 56. Moreover, the magnetic characteristic inspecting apparatus 80 includes magnetic heads 53, 54, 57, and 58 to be placed on the magnetic disks, and write amplifiers 59, 61, 63, and 65 and read amplifiers 60, 62, 64, and 66 that are associated with the respective magnetic heads.

The disk rotating devices 51 and 55 rotate in response to a rotation control signal sent from a control unit 76, and transmit a timing signal "a" or "b," which indicates the timings of rotations, to a signal switching unit 74. The signal switching unit selects either of the timing signals "a" and "b" and transmits the selected timing signal to the control unit 76. The control unit 76 controls the write signal production unit 73, and the measurement resources included in measurement units 72 and 78, and a switching/distribution control unit 75 according to the timings indicated by the timing signal.

The output terminal of the write signal production unit 73 is connected to the write amplifiers 59, 61, 63, and 65 via a switching/distribution unit 69. An output of the write signal production unit is transferred to the write amplifier 59 by turning on the switch SW1 included in the switching/distribution unit, transferred to the write amplifier 61 by turning on the switch SW2 included therein, transferred to the write amplifier 63 by turning on the switch SW3 included therein, and transferred to the write amplifier 65 by turning on the switch SW4 included therein.

The measurement resources 1a, 1b, 2a, 2b, 3a, 3b, 4a and 4c receive an enabling signal from the control unit 76 over the control bus 300. When the enabling signal assumes an on-state level, the measurement resources perform measurement.

The switching/distribution control unit 75 controls the switching/distribution unit 69 and switching units 67, 68, and 74 in response to a signal sent from the control unit 76. The switching unit 67 selects one of output signals of the read amplifiers 60 and 64 respectively, and transmits the selected output signal to each of a low-pass filter 70 and the measurement resource 3a. The signal having passed through the low-pass filter 70 is transmitted to each of the measurement resources 1a, 2a, and 4a. Likewise, the switching unit 68 selects one of output signals of the read amplifiers 62 and 66 respectively, and transmits the selected output signal to each of a low-pass filter 71 and the measurement resource 3b. The signal having passed through the low-pass filter 71 is transmitted to each of the measurement resources 1b, 2b, and 4b.

Actions to be performed in the magnetic characteristic inspecting apparatus 80 shown in FIG. 6 will be described in conjunction with the timing chart of FIG. 7.

First, the control unit 76 transmits a rotation control signal, with which the number of rotations and the start or stop of rotation are controlled, to the disk rotating device 51 in response to a signal sent from a host personal computer 77. Concurrently, the control unit 76 transmits a signal to the switching/distribution control unit 75. The switching/distribution control unit extends control so that the switching unit 74 will pass the timing signal "a," the switching unit 67 will pass an output signal of the read amplifier 60, and the switching unit 68 will pass an output signal of the read amplifier 62. Furthermore, the switching/distribution control unit turns on the switches SW1 and SW2 included in the switching/distribution unit 69.

When started, the disk rotating device 51 transmits the timing signal "a," which indicates the timings of rotations and is composed of index pulses or sector pulses, to the control unit 76 via the switching unit 74. The control unit 76 initiates an inspection A' (using the measurement resources 1a and 1b) at timing a1. The control unit 76 first transmits arbitrary frequency pattern designation data, which is used to perform the inspection A, to the write signal production unit 73 so as to designate an arbitrary frequency pattern. Thereafter, the control unit 76 sets an output enabling signal to an on-state level. In response to the output enabling signal, the write signal production unit 73 transmits the arbitrary frequency pattern. The signal exhibiting the arbitrary frequency pattern is recorded in the magnetic disk 52 via the switching/distribution unit 69, write amplifiers 59 and 61, and magnetic heads 53 and 54.

Thereafter, at timing a2, the magnetic heads 53 and 54 reproduce a signal from the magnetic disk 52. The signal reproduced by the magnetic head 53 is transferred to the measurement resource 1a included in the measurement unit 72 via the read amplifier 60, switching unit 67, and low-pass filter 70. Likewise, the signal reproduced by the magnetic head 54 is transferred to the measurement resource 1b. Concurrently, at timing a2, the control unit 76 sets an enabling signal, which is transferred to the measurement resources 1a and 1b, to an on-state level. Consequently, the measurement resources assess the characteristics of the reproduced signal, and transmit assessment data to the host personal computer 77.

At timings a3, etc., and a7, inspections B', C', and D' are performed. At timing a8 when the magnetic heads 53 and 54 have undergone all the inspections, the control unit 76 stops the disk rotating device 51, and transmits a rotation control signal to the disk rotating device 55 so as to start the disk rotating device 55. Concurrently, the control unit 76 transmits a signal to the switching/distribution control unit 75. The switching/distribution control unit extends control so that the switching unit 74 will pass the timing signal "b," the switching unit 67 will pass an output signal of the read amplifier 64, and the switching unit 68 will pass an output signal of the read amplifier 66. Moreover, the switching/distribution control unit turns off the switches SW1 and SW2 included in the switching/distribution unit 69 and turns on the switches SW3 and SW4 included therein.

Thereafter, at timing b1, the inspection of the magnetic heads 57 and 58 is initiated. Meanwhile, the magnetic heads 53 and 54 are replaced with uninspected articles.

As mentioned above, the measurement of the magnetic heads 53 and 54 and the measurement of the magnetic heads 57 and 58 are performed alternately. Consequently, the efficiency in replacement of heads to be performed by a worker improves, and inspection can be achieved smoothly.

According to the present embodiment, a write signal is used in common. In other words, the magnetic heads 53 and 54 or magnetic heads 57 and 58 disposed apart in a radial direction of a disk are controlled at the frequency of a signal sent from the write signal production unit 73. There is therefore no difference in a recording density between the magnetic heads 53 and 54 or magnetic heads 57 and 58. However, if a time required for replacement of the heads is long, for example, the ratio of the head replacement time to an inspection time ranges from a half or a unity, replacements of two pairs of heads can be performed during different time zones. This is advantageous in a point that the efficiency in replacement of heads to be performed by a worker improves.

A Variant of the Second Embodiment

Figure 8:
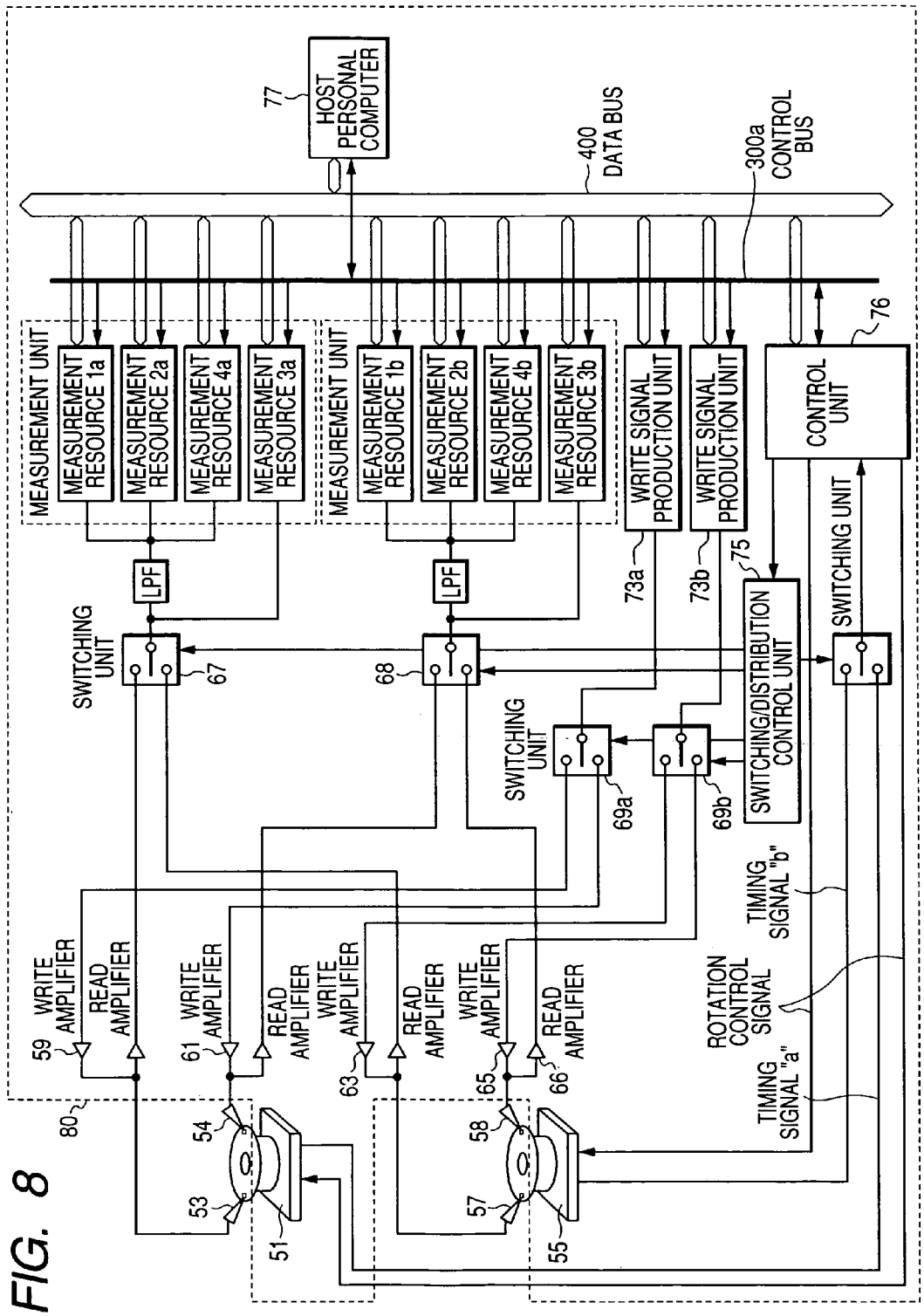
FIG. 8 schematically shows a variant of the second embodiment shown in FIG. 6.

In the second embodiment shown in FIG. 7, the write signal production unit 73 included in the magnetic characteristic inspecting apparatus 80 is shared between inspections of the magnetic heads 53 and 54 or of the magnetic heads 57 and 58. As shown in FIG. 8 as a variant, write signal production units that produce signals of different frequencies may be included in association with two magnetic heads to be inspected simultaneously.

In FIG. 8, an output signal of a write signal production unit 73a is transferred to the write amplifier 59 or 63 by a switching unit 69a, and an output signal of a write signal production unit 73b is transferred to the write amplifier 61 or 65 by a switching unit 69b.

According to the present variant, the number of write signal production units increases. However, the drawback of the second embodiment that the recording densities offered by magnetic heads are different from each other can be overcome.

Another Variant of the Second Embodiment

In the another embodiment shown in FIG. 6, the magnetic characteristic inspecting apparatus is designed so that the disk rotating devices 51 and 55 will be alternately inspected using the write signal production unit 73 and the measurement resources 1a, 1b, 2a, 2b, 3a, 3b, 4a, and 4b.

Figure 9:
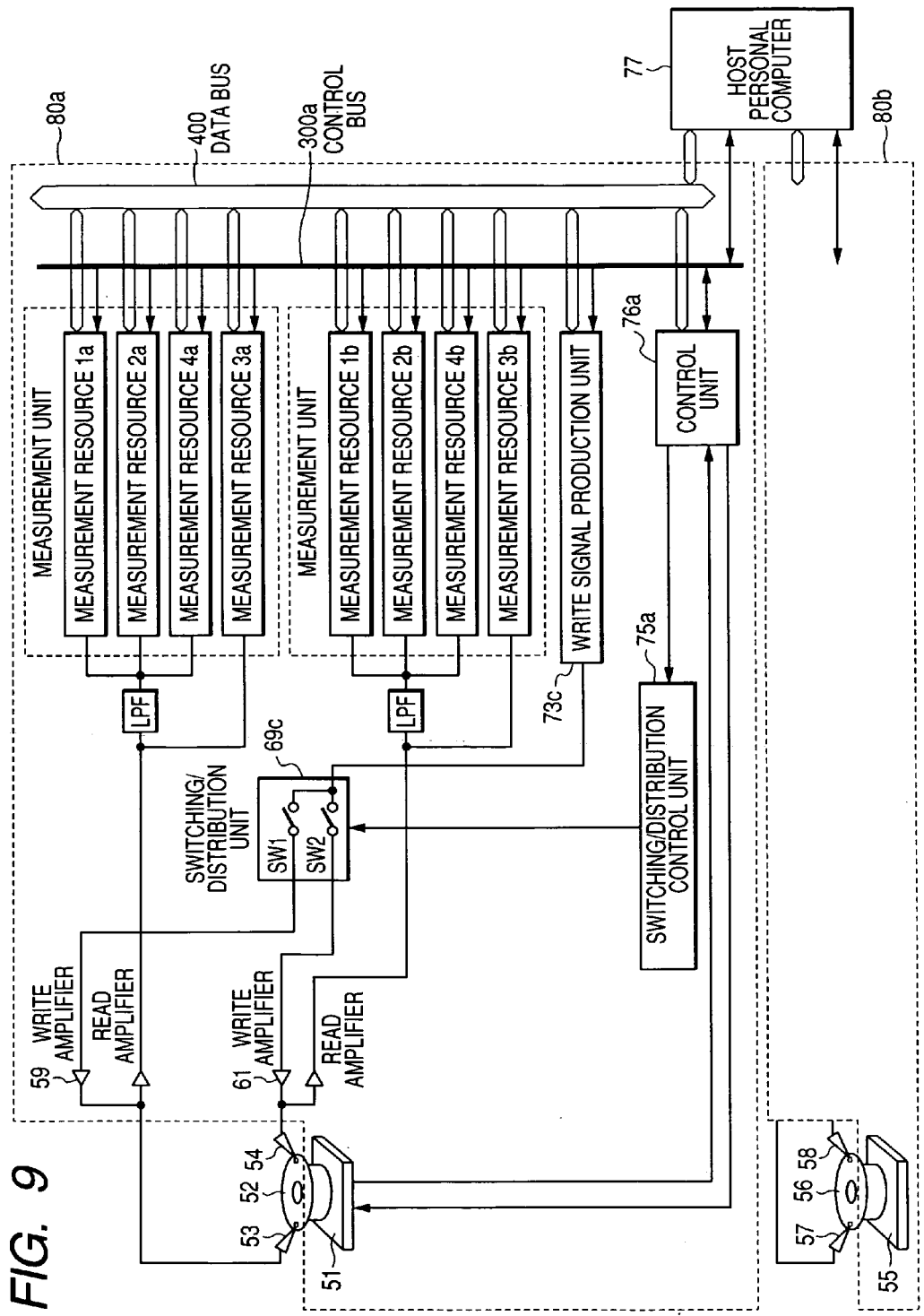
FIG. 9 schematically shows another variant of the second embodiment shown in FIG. 6.

As shown in FIG. 9 as a variant, the write signal production unit and measurement resources may be included in association with each of the disk rotating devices. Specifically, a magnetic characteristic inspecting apparatus 80a and a magnetic characteristic inspecting apparatus 80b each including recording/measurement resources and a control unit are associated with the respective disk rotating devices 51 and 55. In the present variant, the magnetic characteristic inspecting apparatuses 80a and 80b share the same write signal.

Referring to FIG. 9, an output of a write signal production unit 73c is transferred to a switching/distribution unit 69c. When the switch SW1 included in the switching/distribution unit 69c is turned on, the switching/distribution unit 69c transmits a signal to the write amplifier 59. When the switch SW2 included therein is turned on, the switching/distribution unit 69c transmits a signal to the write amplifier 61. The present variant is advantageous in a point that the number of write signal production units is small.

Third Embodiment

Figure 10:
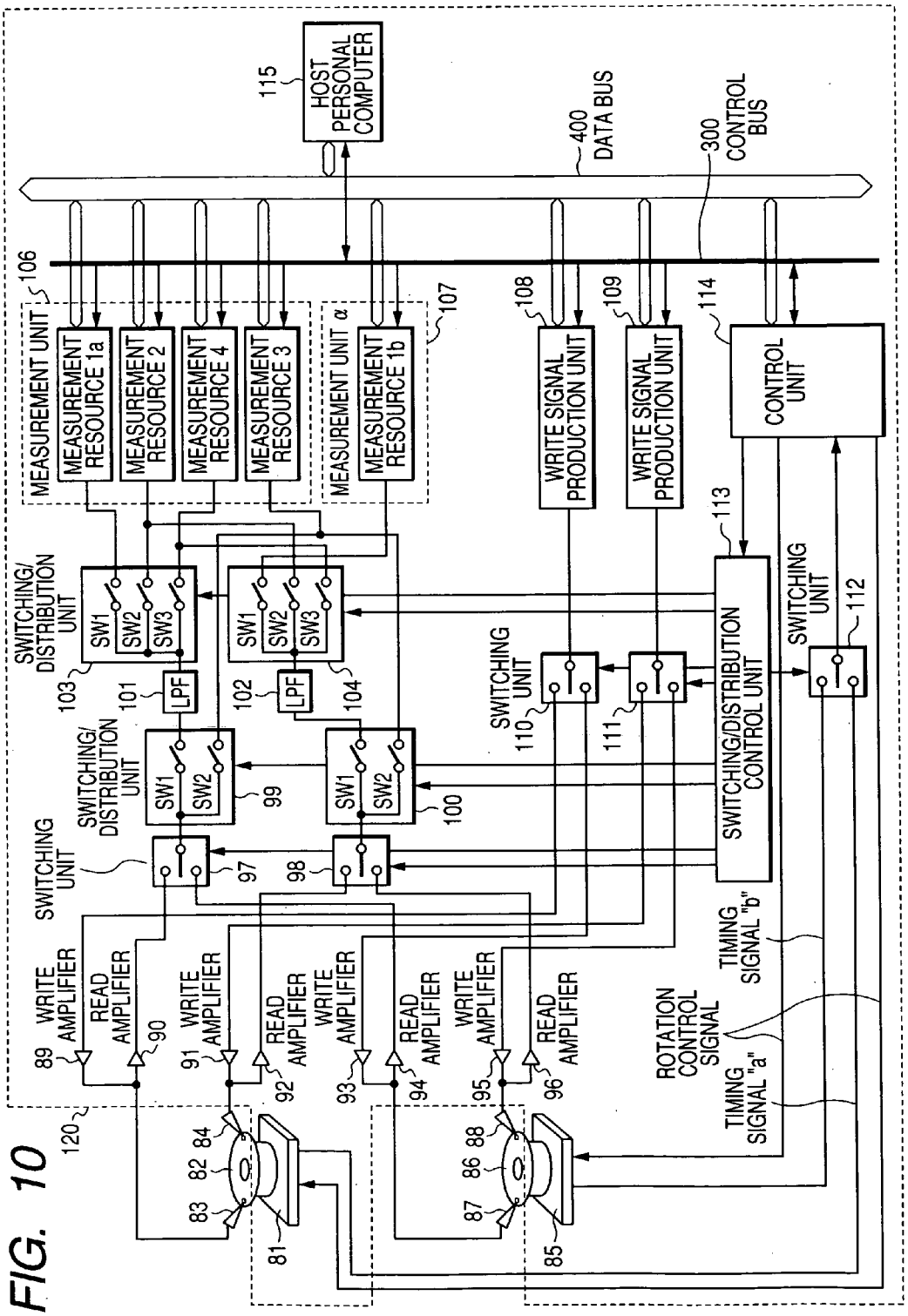
FIG. 10 schematically shows the third embodiment of the magnetic characteristic inspecting apparatus in accordance with the present invention.
Figure 11:
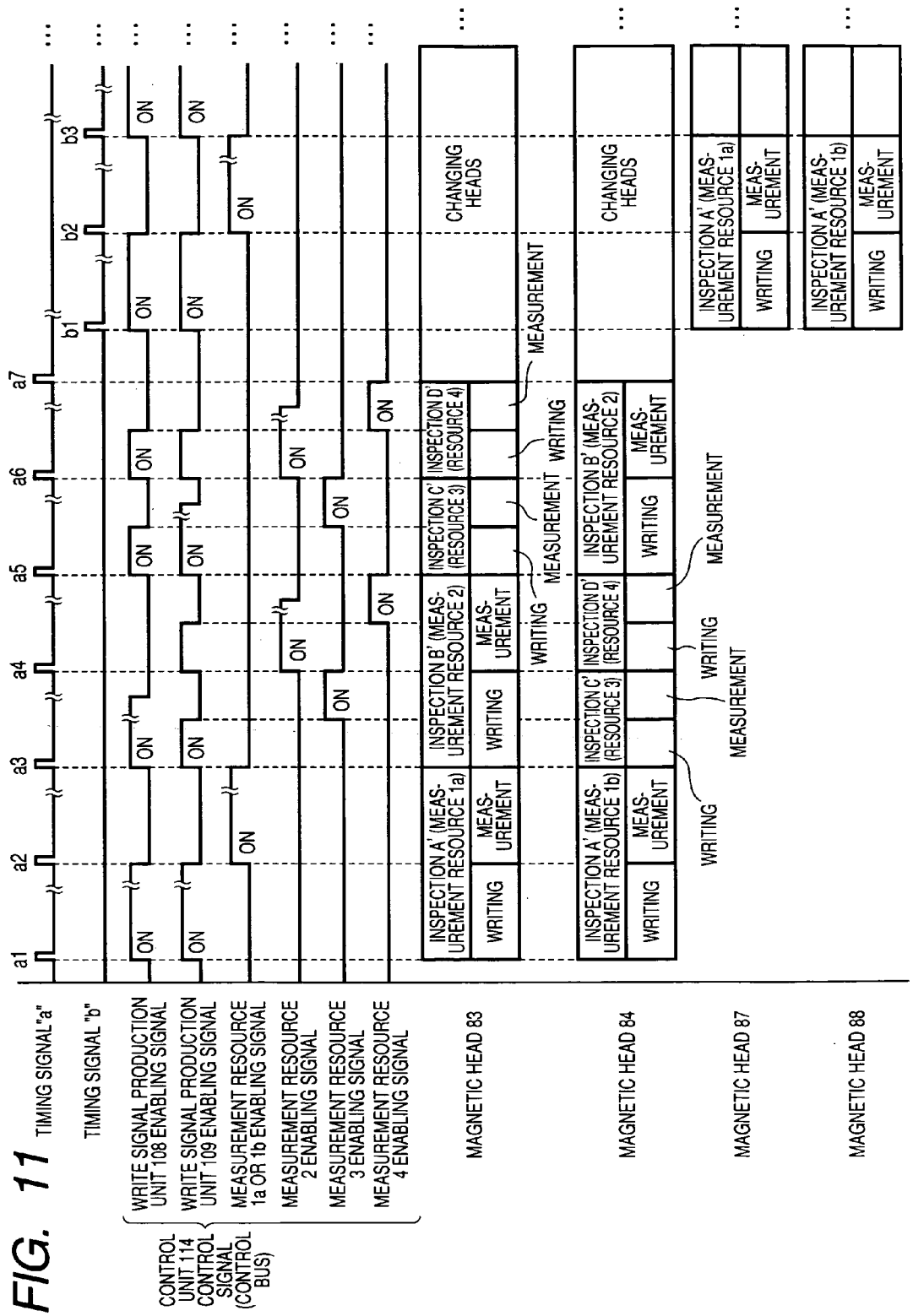
FIG. 11 is a timing chart indicating actions to be performed in the third embodiment of the present invention.

FIG. 10 shows a magnetic characteristic inspecting apparatus in accordance with the third embodiment of the present invention. FIG. 11 is a timing chart indicating actions to be performed in the third embodiment. According to the third embodiment, a magnetic characteristic inspecting apparatus 120 includes a set of measurement resources 1a, 1b, 2, 3, and 4 as measurement resources of a general-purpose type usable for any of two pairs of magnetic heads. Moreover, two write signal production units (108 and 109) are included in association with the two pairs of magnetic heads. The two pairs of magnetic heads are controlled at two independent frequencies so that the internal and external magnetic heads constituting each pair will offer the same recording density.

Referring to FIG. 10, the magnetic characteristic inspecting apparatus 120 includes two disk rotating devices 81 and 85 and two magnetic disks 82 and 86. Moreover, the magnetic characteristic inspecting apparatus 120 includes magnetic heads 83, 84, 87, and 88 to be placed on the magnetic disks, and write amplifiers 89, 91, 93, and 95 and read amplifiers 90, 92, 94, and 96 that are associated with the respective magnetic heads. The disk rotating devices 81 and 85 rotate in response to a rotation control signal sent from a control unit 114, and transmit a timing signal "a" or "b," which indicates the timings of rotations, to a switching unit 112. The switching unit 112 selects either of the timing signals, and transmits the selected timing signal to a control unit 114. Based on the timings indicated by the timing signal, the control unit 114 controls write signal production units 108 and 109, measurement resources included in a measurement unit 106 and a measurement unit α 107, and a switching/distribution control unit 113.

An output signal of the write signal production unit 108 is transferred to either the write amplifier 89 or 93 by means of a switching unit 110. An output signal of the write signal production unit 109 is transferred to either the write amplifier 91 or 95 by means of a switching unit 111.

The measurement resources 1a, 1b, 2, 3, and 4 receive an enabling signal from the control unit 114 over a control bus 300. When the enabling signal assumes an on-state level, the measurement resources perform measurement.

The switching/distribution control unit 113 controls the switching units 97, 98, 110, 111, and 112 and the switching/distribution units 99, 100, 103, and 104 according to a signal sent from the control unit 114. The switching/distribution unit 97 selects one of the output signals of the read amplifiers 90 and 94 respectively, and transmits the selected signal to the switching/distribution unit 99. Likewise, the switching/distribution unit 98 selects one of the output signals of the read amplifiers 92 and 96 respectively, and transmits the selected output signal to the switching/distribution unit 100.

The switching/distribution units 99, 100, 103, and 104 switch the output signals of the switching units 97 and 98 or distribute them to the measurement resources. The output terminal of the switching unit 97 is connected to the switching/distribution unit 99. The output terminal of the switch SW1 included in the switching/distribution unit 99 is connected to the switching/distribution unit 103 via a low-pass filter 101, and the output terminal of the switch SW2 included therein is connected to the measurement resource 3. The output terminal of the switch SW1 included in the switching/distribution unit 103 is connected to the measurement resource 1a, the output terminal of the switch SW2 included therein is connected to the measurement resource 2, and the output terminal of the switch SW3 included therein is connected to the measurement resource 4.

Likewise, the output terminal of the switching unit 98 is connected to the switching/distribution unit 100. The output terminal of the switch SW1 included in the switching/distribution unit 100 is connected to the switching/distribution unit 104 via a low-pass filter 102, and the output terminal of the switch SW2 included therein is connected to the measurement resource 3. The output terminal of the switch SW1 included in the switching/distribution unit 104 is connected to the measurement resource 1b, the output terminal of the switch SW2 included therein is connected to the measurement resource 2, and the output terminal of the switch SW3 included therein is connected to the measurement resource 4.

The output terminals of the switches SW2 included in the switching/distribution units 99 and 100, the output terminals of the switches SW2 included in the switching/distribution units 103 and 104, and the output terminals of the switches SW3 included in the switching/distribution units 103 and 104 are connected to each other. The control unit 114 extends control so as not to simultaneously select the switches whose output terminals are connected to each other.

Referring to the timing chart of FIG. 11, actions to be performed in the magnetic characteristic inspecting apparatus shown in FIG. 10 will be described below.

First, the control unit 114 transmits a rotation control signal, with which the number of rotations and the start or stop of rotation are controlled, to the disk rotating device 81 in response to a signal sent from a host personal computer 115. Concurrently, the control unit 114 transmits a signal to the switching/distribution control unit 113. The switching/distribution control unit 113 extends control so that the switching unit 112 will pass the timing signal "a," the switching unit 97 will pass an output signal of the read amplifier 90, and the switching unit 98 will pass an output signal of the read amplifier 92. Moreover, the switching/distribution control unit 113 extends control so that the switching unit 110 will transmit a signal to the write amplifier 90 and the switching unit 111 will transmit a signal to the write amplifier 91.

While rotating, the disk rotating device 81 transmits the timing signal "a," which indicates the timings of rotations and is composed of index pulses or sector pulses, to the control unit 114 via the switching unit 112. The control unit 114 initiates an inspection A' (using the measurement resources 1a and 1b) at timing a1. The control unit 114 first controls the switching/distribution control unit 113. The switching/distribution control unit 113 turns on the switches SW1 included in the switching/distribution units 99 and 100 and the switches SW1 included in the switching/distribution units 103 and 104. Concurrently, the control unit 114 transmits arbitrary frequency pattern designation data, which is used to perform the inspection A', to the write signal production units 108 and 109 so as to designate an arbitrary frequency pattern for the write signal production units. Thereafter, the control unit 114 sets an output enabling signal, which is transferred to the write signal production units, to an on-state level. In response to the enabling signal, the write signal production units 108 and 109 transmit the arbitrary frequency pattern. The signals exhibiting the arbitrary frequency patterns are recorded in the magnetic disk 82 via the switching unit 110 or 111, the write amplifier 89 or 91, and the magnetic head 83 or 84.

Thereafter, at timing a2, the magnetic heads 89 and 91 initiate reproduction of a signal from the magnetic disk 82. The signal reproduced by the magnetic head 83 is transferred to the measurement resource 1a included in the measurement unit 106 via the read amplifier 90, switching unit 97, switching/distribution unit 99, low-pass filter 101, and switching/distribution unit 103. Likewise, the signal reproduced by the magnetic head 84 is transferred to the measurement resource 1b. Concurrently, at timing a2, the control unit 114 sets an enabling signal, which is transferred to the measurement resources 1a and 1b, to an on-state level. Consequently, the measurement resources assess the characteristics of the reproduced signal, and transmit assessment data to the host personal computer 115.

Thereafter, at timing a3, an inspection B' is performed on the magnetic head 83 and an inspection C' is performed on the magnetic head 84. The control unit 114 transmits a signal to the switching/distribution control unit 113. The switching/distribution control unit 113 turns on the switch SW1 included in the switching/distribution unit 99, the switch SW2 included in the switching/distribution unit 100, the switch SW2 included in the switching/distribution unit 103. Concurrently, the switching/distribution control unit 113 transmits arbitrary frequency pattern designation data, which is used to perform the inspection B', to the write signal production unit 108 so as to designate an arbitrary frequency pattern for the writ signal production unit, and transmits arbitrary frequency pattern designation data, which is used to perform the inspection C', to the write signal production unit 109 so as to designate an arbitrary frequency pattern for the write signal production unit. Thereafter, an output enabling signal that is transferred to each of the write signal production units is set to an on-state level.

In response to the enabling signal, the write signal production units 108 and 109 transmit the respective arbitrary frequency pattern. The signals exhibiting the respective arbitrary frequency patterns are recorded in the magnetic disk 82 via the switching unit 110 or 111, the write amplifier 89 or 91, and the magnetic head 83 or 84. For the inspection C' of the magnetic head 84, measurement is initiated after the completion of the recording. The signal reproduced by the magnetic head 84 is transferred to the measurement resource 3 included in the measurement unit 106 via the read amplifier 92, switching unit 98, and switching/distribution unit 100. Concurrently, the control unit 114 sets an enabling signal, which is transferred to the measurement resource 3, to the on-state level. The measurement resource 3 assesses the characteristics of the reproduced signal and transmits assessment data to the host personal computer 115.

At timing a4, the magnetic head 83 initiates reproduction of a signal from the magnetic disk 82. The signal reproduced by the magnetic head 83 is transferred to the measurement resource 2 included in the measurement unit 106 via the read amplifier 90, switching unit 97, switching/distribution unit 99, low-pass filter 101, and switching/distribution unit 103. Concurrently, the control unit 114 sets an enabling signal, which is transferred to the measurement resource 2, to an on-state level. Consequently, the measurement resource 2 assesses the characteristics of the reproduced signal and transmits assessment data to the host personal computer 115.

Moreover, at the timing a4, an inspection D' is performed on the magnetic head 84. The control unit 114 transmits a signal to the switching/distribution control unit 113. The switching/distribution control unit 113 turns on the switch SW1 included in the switching/distribution unit 100 and the switch SW3 included in the switching/distribution unit 104. Concurrently, the switching/distribution control unit 113 transmits arbitrary frequency pattern designation data, which is used to perform the inspection D', to the write signal production unit 109 so as to designate an arbitrary frequency pattern for the write signal production unit. Thereafter, an output enabling signal that is transferred to the write signal production unit is set to an on-state level. In response to the enabling signal, the write signal production unit 109 transmits the arbitrary frequency pattern. The signal exhibiting the arbitrary frequency pattern is recorded in the magnetic disk 82 via the switching unit 111, write amplifier 91, and magnetic head 84.

For the inspection D' of the magnetic head 84, measurement is initiated after the completion of writing. The signal reproduced by the magnetic head 84 is transferred to the measurement resource 4 included in the measurement unit 106 via the read amplifier 92, switching unit 98, switching/distribution unit 100, low-pass filter 102, and switching/distribution unit 104. Concurrently, the control unit 114 sets an enabling signal, which is transferred to the measurement resource 4, to the on-state level. The measurement resource 4 assesses the characteristics of the reproduced signal and transmits assessment data to the host personal computer 115.

At subsequent timings, inspections are performed in the same manner. At timing a7 when the magnetic heads 83 and 84 have undergone all inspections, the control unit 114 stops the disk rotating device 81, and transmits a rotation control signal to the disk rotating device 85 so as to start the disk rotating device 85. Concurrently, the control unit 114 transmits a signal to the switching/distribution control unit 113.

The switching/distribution control unit 113 extends control so that the switching unit 114 will pass the timing signal "b," the switching unit 97 will pass an output signal of the read amplifier 94, and the switching unit 98 will pass an output signal of the read amplifier 96. Furthermore, the switching/distribution control unit 113 extends control so that the switching unit 110 will transmit a signal to the write amplifier 93 and the switching unit 111 will transmit a signal to the write amplifier 95.

Thereafter, at timing b1, the inspections of the magnetic heads 87 and 88 are initiated. Meanwhile, the magnetic heads 83 and 84 are replaced with uninspected articles.

As mentioned above, according to the present embodiment, one set of measurement resources is shared among inspections of two pairs of magnetic heads. This results in a compact and low-cost magnetic characteristic inspecting apparatus. For example, when the magnetic heads 83 and 84 are inspected, writings and measurements included in inspections B', C, and D' are performed concurrently. The use efficiency of measurement resources further improves, though there is a concern about degradation in measurement precision derived from the adverse effect of noises. Moreover, since measurements of the magnetic heads 83 and 84 and the magnetic heads 87 and 88 are performed alternately, the efficiency in replacement of heads to be performed by a worker improves. Inspection can be performed smoothly.

A Variant of the Third Embodiment

Figure 12:
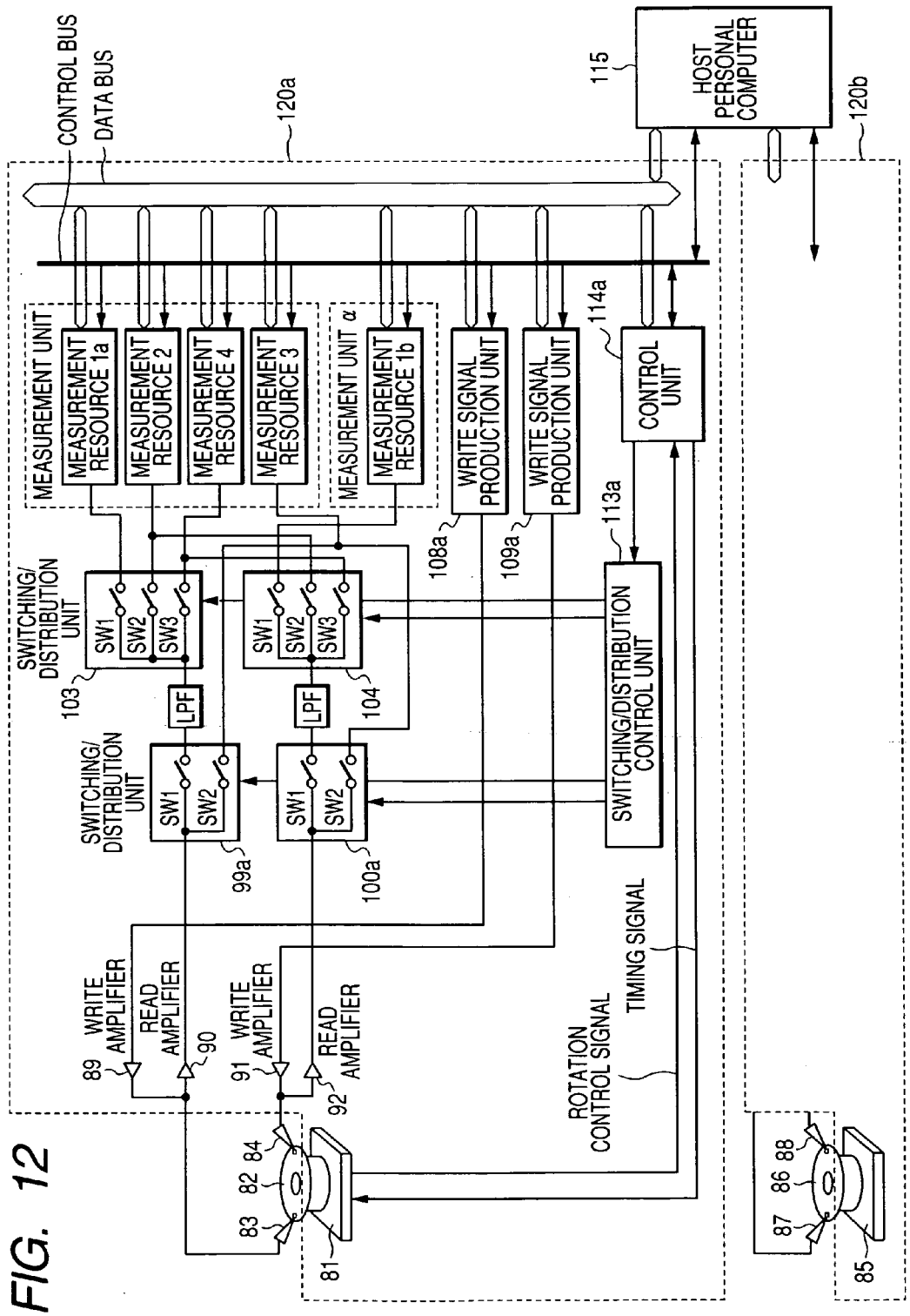
FIG. 12 schematically shows a variant of the third embodiment.
Figure 13:
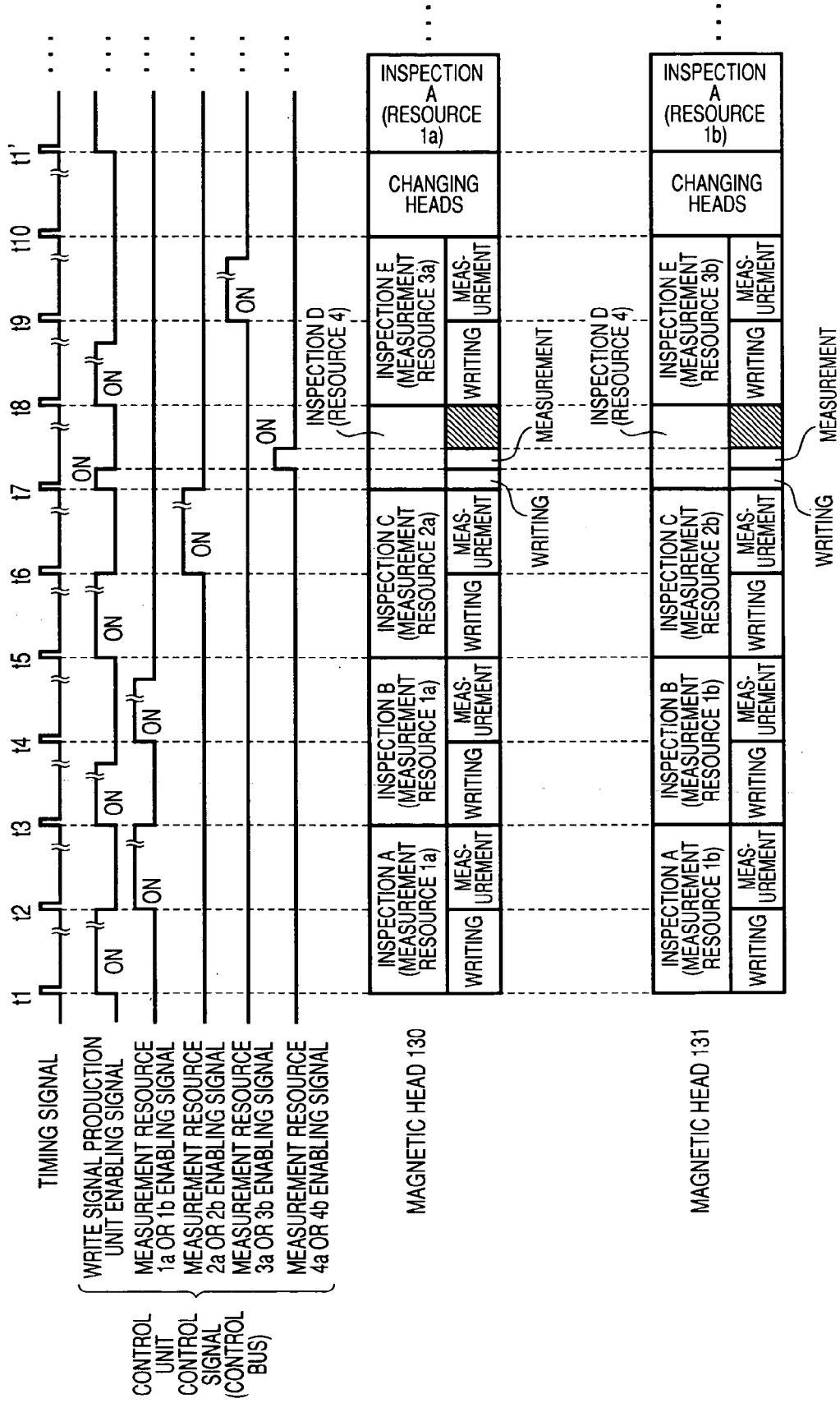
FIG. 13 is a timing chart describing actions to be performed in a conventional magnetic characteristic inspecting apparatus.

According to the third embodiment shown in FIG. 10, the disk rotating devices 81 and 85 are inspected alternately using the write signal production units 108 and 109 and the measurement resources 1a, 1b, 2, 3, and 4. As shown in FIG. 12 as a variant, an inspecting apparatus may be divided into two magnetic characteristic inspecting apparatuses 120a and 120b, and write signal production units and measurement resources may be included in association with the respective disk rotating devices 81 and 85.

Referring to FIG. 12, outputs of write signal production units 108a and 109a respectively are directly transferred to write amplifiers 89 and 91 respectively, and outputs of read amplifiers 90 and 92 respectively are directly transferred to switching/distribution control units 99a and 100a respectively. A timing signal "a" is directly transferred to the disk rotating device from a control unit 114a.

In the aforesaid embodiments and variants of a magnetic characteristic inspecting apparatus, the number of (N) disk rotating devices (and the number of magnetic disks mounted on the disk rotating devices) is two, and the number of (M) magnetic heads to be placed on each of the magnetic disks is two. Moreover, the number of (T) kinds of measurement resources is four, and the number of (R) write signal production units is one or two. Needless to say, the N, M, T, and R values are not limited to these values. The (M) magnetic heads, (T) measurement resources, and (R) write signal production units may number one or may fall into one kind or more.

However, one of the features of a magnetic characteristic inspecting apparatus in accordance with the present invention is that a plurality of (N) disk rotating devices are included. The employment of a means for switching the plurality of disk rotating devices so that recording/measurement resources will perform measurement synchronously with any of the disk rotating devices makes it possible to share the recording/measurement resources for inspection.

Moreover, the switching/distribution units included in the aforesaid embodiments and variants each include switches.

Needless to say, the present invention is not limited to relays or semiconductor switches. Alternatively, an enabling signal with which a semiconductor distribution buffer is enabled to operate may be adopted in order to realize the switching/distribution units.

According to the present invention, measurement resources and write signal production units can be shared among inspections of magnetic disks or magnetic heads. Consequently, a magnetic characteristic inspecting apparatus can be realized to be compact and low-cost. Moreover, while high measurement precision is ensured, the number of simultaneously measurable magnetic heads or magnetic disks can be increased. This results in improved inspection efficiency.

What is claimed is:

1. A magnetic characteristic inspecting apparatus, comprising:
   a plurality of disk rotating devices that rotate a magnetic disk;
   magnetic heads to be placed on respective magnetic disks held by the respective disk rotating devices;
   write signal production units that produce a write signal;
   a plurality of kinds of measurement units that inspect the characteristics of a read signal;
   a switching/distribution control unit that switches or distributes the output signals of the write signal production units, and switches or distributes read signals to be transferred to the measurement units; and
   a disk rotating device selecting element that selects one of the plurality of disk rotating devices synchronously with which each of the measurement units will operate.

2. A magnetic characteristic inspecting apparatus having an ability to inspect writable or readable magnetic disks or magnetic heads, comprising:
   disk rotating devices that rotate a magnetic disk;
   magnetic heads to be placed on respective magnetic disks mounted on the respective disk rotating devices;
   write signal production units that produce a write signal to be applied to each of the magnetic disks by each of the magnetic heads; and
   measurement units each including a plurality of kinds of measurement resources that assess the characteristics of the waveform of a reproduced signal which corresponds to the write signal read from each of the magnetic disks, wherein:
   the disk rotating devices include a plurality of independent disk rotating devices; and
   the measurement resources include at least one type of measurement resources usable for inspections of both of the disk rotating devices, further comprising:
   a switching/distribution control unit that controls the connectional relationship of the plurality of magnetic heads to the write signal production units and the measurement units; and
   a disk rotating device selecting element that selects one of the plurality of disk rotating devices synchronously to which each of the measurement resources included in the measurement units will operate.

3. The magnetic characteristic inspecting apparatus according to claim 2, wherein the disk rotating device selecting element includes a selecting switch that allows each of the measurement units to select a timing signal which is synchronous with either of the disk rotating devices.

4. The magnetic characteristic inspecting apparatus according to claim 2, further comprising a plurality of control buses over which timing signals synchronous with the respective disk rotating devices are transmitted, wherein the disk rotating device selecting element includes a selecting switch via which each of the measurement units is connected to any of the plurality of control buses.

5. The magnetic characteristic inspecting apparatus according to claim 4, wherein the switching/distribution control unit extends control so as to switch or distribute the output signals of the write signal production units and switch or distribute read signals to be transferred to the measurement units according to a timing signal sent from a disk rotating device selected by the disk rotating device selecting element.

6. The magnetic characteristic inspecting apparatus according to claim 5, wherein the switching/distribution control unit includes a switching/distribution unit that extends control so as to switch the plurality of magnetic heads so that an output of one write signal production unit will be transferred to a selected magnetic head.

7. The magnetic characteristic inspecting apparatus according to claim 2, wherein the measurement resources include at least one type of measurement resources usable for any magnetic heads and at least one type of measurement resources usable exclusively for specific magnetic heads.

8. The magnetic characteristic inspecting apparatus according to claim 1, wherein:
   a plurality of write signal production units and a plurality of kinds of measurement resources are included;
   the measurement resources include recording/measurement resources of a general-purpose type usable for any magnetic heads and recording/measurement resources of a limited type usable for specific magnetic heads; and
   part of the recording/measurement resources is used in common in order to inspect all the magnetic heads at nearly identical timings and replace the magnetic heads with new ones at nearly identical timings.

9. The magnetic characteristic inspecting apparatus according to claim 1, wherein:
   a plurality of kinds of measurement resources are included; and
   the magnetic heads are inspected at different timings associated with the respective disk rotating devices, and replaced with new ones at different timings associated with the respective disk rotating devices.

10. The magnetic characteristic inspecting apparatus according to claim 1, wherein:
    a plurality of kinds of measurement resources are included; and
    the measurement resources include first measurement resources which are used for assessment of an item of a characteristic to be performed first and the number of which corresponds to a total number of magnetic heads.

11. The magnetic characteristic inspecting apparatus according to claim 1, wherein:
    a plurality of kinds of measurement resources are included; and
    the measurement resources include second measurement resources which are used during a half or more of a total time required for all tests and the number of which corresponds to a total number of magnetic heads.

12. The magnetic characteristic inspecting apparatus according to claim 1, wherein:
    a plurality of types of measurement resources are included; and
    the measurement resources include third measurement resources which are used during an inspection time that is a half or less of a pulse duration of a timing signal.

13. A magnetic characteristic inspecting apparatus, comprising:
    a plurality of disk rotating devices that rotate a magnetic disk;
    magnetic heads to be placed on respective magnetic disks held on the respective disk rotating devices;
    at least one write signal production unit that produces a write signal;
    at least one kind of measurement units that assess the characteristics of the waveform of a read signal;
    a switching/distribution control unit that switches or distributes the output signal of the at least one write signal production unit and switches or distributes read signals to be transferred to the measurement units; and
    a disk rotating device selecting element that selects any of the plurality of disk rotating devices synchronously with which each of the measurement units will operate.

14. The magnetic characteristic inspecting apparatus according to claim 13, wherein only one write signal production unit is provided, further comprising:
    a signal switching unit that selects any of a plurality of timing signals which indicate the timings of rotations made by each of the disk rotating devices and that transmits the selected signal to a control unit.

15. A magnetic characteristic inspecting method for inspecting writable and readable magnetic disks or magnetic heads using a magnetic characteristic inspecting apparatus having an ability to inspect magnetic disks or magnetic heads, wherein: the magnetic characteristic inspecting apparatus comprises disk rotating devices that rotate a magnetic disk, magnetic heads to be placed on respective magnetic disks mounted on the respective disk rotating devices, write signal production units that produce a write signal to be applied to each of the magnetic disks by each of the magnetic heads, and measurement units each including a plurality of kinds of measurement resources that assess the characteristics of the waveform of a reproduced signal which corresponds to the write signal read from each of the magnetic disks; the disk rotating devices include a plurality of independent disk rotating devices; and the measurement resources include at least one type of measurement resources usable for inspections of both the disk driving devices, the magnetic characteristic inspecting method comprising the steps of:
    controlling the connectional relationship of the plurality of magnetic heads to the write signal production units and the measurement units;
    selecting any of the plurality of disk rotating devices synchronously with which each of the measurement resources included in the measurement units will operate; and
    using the measurement resources to perform inspection at a timing synchronous with the rotation of the selected disk rotating device.

16. The magnetic characteristic inspecting method according to claim 15, wherein:
    the measurement resources are used to concurrently inspect the plurality of disk rotating devices at the timing; and
    the plurality of disk rotating devices are alternately inspected using the measurement resources usable for the inspections of both the disk rotating devices.

17. The magnetic characteristic inspecting method according to claim 15, wherein:
    the measurement resources include first measurement resources which are used for assessment of an item of a characteristic to be performed first and the number of which corresponds to a total number of magnetic heads; and
    the first measurement resources are used to initiate inspections of the respective magnetic heads simultaneously.

18. The magnetic characteristic inspecting method according to claim 15, wherein:
the measurement resources include recording/measurement resources of a general-purpose type usable for any magnetic heads and recording/measurement resources of a limited type usable exclusively for specific magnetic heads; and
part of the recording/measurement resources is used in common in order to inspect the magnetic heads or replace the magnetic heads with new ones at different timings that are different from each other in association with the respective disk rotating devices.

* * * * *